US012644527B2

(12) United States Patent
Wang et al.

(10) Patent No.: US 12,644,527 B2
(45) Date of Patent: Jun. 2, 2026

(54) FLUID CONTROL ASSEMBLY AND FLUID CONTROL DEVICE

(71) Applicant: ZHEJIANG SANHUA AUTOMOTIVE COMPONENTS CO., LTD., Hangzhou (CN)

(72) Inventors: Lixin Wang, Hangzhou (CN); Yun Wang, Hangzhou (CN); Long Lin, Hangzhou (CN); Jianhua Chi, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 8 days.

(21) Appl. No.: 18/270,191

(22) PCT Filed: Dec. 30, 2021

(86) PCT No.: PCT/CN2021/142870
§ 371 (c)(1),
(2) Date: Jun. 28, 2023

(87) PCT Pub. No.: WO2022/143865
PCT Pub. Date: Jul. 7, 2022

(65) Prior Publication Data
US 2024/0084902 A1     Mar. 14, 2024

(30) Foreign Application Priority Data

Dec. 31, 2020   (CN) .......................... 202011625561.2
Dec. 31, 2020   (CN) .......................... 202011626190.X

(51) Int. Cl.
F16K 11/085      (2006.01)
F16K 5/04        (2006.01)
F16K 27/06       (2006.01)

(52) U.S. Cl.
CPC ........ F16K 11/0853 (2013.01); F16K 5/0407 (2013.01); F16K 27/065 (2013.01)

(58) Field of Classification Search
CPC .......................... F16K 11/0853; F16K 11/0856
See application file for complete search history.

(56) References Cited

U.S. PATENT DOCUMENTS 5,848,611 A  *  12/1998  Stanevich ........... F16K 11/0856
                                                         137/353
6,289,913 B1      9/2001  Babin
                         (Continued)

FOREIGN PATENT DOCUMENTS

CN        201739598 U      2/2011
CN        102678970 A      9/2012
                    (Continued)

OTHER PUBLICATIONS

The Japanese 1st Office Action issued on Feb. 20, 2024 for JP2023-540521.
(Continued)

*Primary Examiner* — Michael R Reid
(74) *Attorney, Agent, or Firm* — Yue (Robert) Xu; Apex Attorneys at Law, LLP

(57) ABSTRACT

A fluid control assembly and a fluid control device are provided. The fluid control assembly includes a valve body component and a valve core component. At least part of the valve core component is located in a valve cavity. The valve body component is provided with a body portion and a protruding portion. The body portion forms at least part of a wall portion of the valve cavity, and the protruding portion protrudes from the peripheral wall of the body portion. The fluid control assembly is provided with a first flow channel, and at least part of the first flow channel is located in the valve core component. The protruding portion is provided with two or more lugs, at least some of the lugs are provided
(Continued)

with the second flow channels, and circulation ports of at least some of the second flow channels have the same orientation.

14 Claims, 19 Drawing Sheets

(56)                    References Cited

U.S. PATENT DOCUMENTS

| | | | |
|---|---|---|---|
| 2018/0119840 A1 | 5/2018 | Hishiya | |
| 2020/0200284 A1* | 6/2020 | Ledvora | ............. F16K 11/0856 |

FOREIGN PATENT DOCUMENTS

| | | | |
|---|---|---|---|
| CN | 105135000 | A | 12/2015 |
| CN | 105626922 | A | 6/2016 |
| CN | 210637528 | U | 5/2020 |
| CN | 111322432 | A | 6/2020 |
| CN | 211820842 | U | 10/2020 |
| JP | H04282083 | A | 10/1992 |
| JP | H0828727 | A | 2/1996 |
| JP | H08338544 | A | 12/1996 |
| JP | 2018071643 | A | 5/2018 |
| KR | 200398107 | Y1 | 10/2005 |
| WO | 2007059394 | A1 | 5/2007 |

OTHER PUBLICATIONS

International Search Report for PCT/CN2021/142870 mailed Mar. 29, 2022, ISA/CN.
The European search report issued on Nov. 5, 2024 for EP21914596. 8.
The Japanese 1st Office Action issued on Sep. 16, 2025 for JP2024-159873.
The Japanese 2nd Office Action issued on Feb. 17, 2026 for JP2024-159873.

* cited by examiner

FLUID CONTROL ASSEMBLY AND FLUID CONTROL DEVICE

The present application is the national phase of International Application No. PCT/CN2021/142870, titled "FLUID CONTROL ASSEMBLY AND FLUID CONTROL DEVICE", filed on Dec. 30, 2021, which claims the benefits of priorities to the following Chinese patent applications: Chinese Patent Application No. 202011625561.2, titled "FLUID CONTROL DEVICE", filed with the China National Intellectual Property Administration on Dec. 31, 2020; and Chinese Patent Application No. 202011626190.X, titled "FLUID CONTROL ASSEMBLY AND FLUID CONTROL DEVICE", filed with the China National Intellectual Property Administration on Dec. 31, 2020, the entire disclosures thereof are incorporated herein by reference.

FIELD

The present application relates to the technical field of fluid control, and in particular to a fluid control assembly and a fluid control device.

BACKGROUND

Switching of flow channels of fluids is required in a vehicle thermal management system, therefore, a flow channel switching valve for switching between multiple flow channels is employed in the vehicle thermal management system for flow path control. The flow channel switching valve has a valve body and a valve core, the valve core is accommodated in the valve body. Generally, a flow channel switching valve has a structure similar to the structure shown in FIG. 1, two or more connecting pipes 2 protrude from a periphery of the valve body 1, external pipelines are connected with the connecting pipes, the valve core moves inside the valve body, to change the communication mode of the flow channels.

In most cases, different types of vehicle employ different vehicle thermal management systems. Some vehicle thermal management systems may employ a four-way flow channel switching valve, and some may employ a five-way flow channel switching valve. Therefore, the factory that manufactures the flow channel switching valves needs to manufacture various types of flow channel switching valves for matching different systems; what's more, sometimes customers may have different requirements for the connecting port positions due to some reasons, in this case, many types of flow channel switching valves are required to be manufactured to meet the needs of customers. Sometimes, just because the appearance of the product is changed, the production line for producing the product has to be changed. Therefore, manufacture of various types of flow channel switching valves causes great investment costs to the manufacture factory.

SUMMARY

An object of the present application is to provide a fluid control assembly and a fluid control device which are convenient for standardization.

To achieve the above object, the following technical solutions are provided.

A fluid control assembly, includes a valve body component and a valve core component, the fluid control assembly has a valve cavity, at least part of the valve core component is located in the valve cavity;

where the valve body component is provided with a body portion and a protruding portion, the body portion forms at least part of a wall portion of the valve cavity, the protruding portion protrudes from a peripheral wall of the body portion; the fluid control assembly is provided with a first flow channel, at least part of the first flow channel is located in the valve core component, the protruding portion is provided with two or more second flow channels, and the second flow channel can be in communication with the first flow channel;

where the protruding portion is provided with two or more lugs, at least part of the lugs have the second flow channel, communication ports of at least part of the second flow channels face a same direction.

To achieve the above object, the following technical solution is further provided. A fluid control device includes the above fluid control assembly, and further includes a flow channel connecting portion, the flow channel connecting portion is provided with two or more third flow channels, the communication ports of the at least part of the second flow channels of the lugs face the same direction, that is, facing toward the flow channel connecting portion; the second flow channel is in communication with the corresponding third flow channel, the second flow channel and the third flow channel which are in communication with each other are sealingly arranged.

The fluid control assembly of the above technical solution of the present application includes the valve body component, the protruding portion of the valve body component has two or more lugs, and communication ports of at least part of the second flow channels face the same direction. In this way, it is convenient to assemble the fluid control assembly with various forms of flow channel connecting portions, which is suitable for various applications, and thereby facilitating the standardization of the fluid control assembly.

BRIEF DESCRIPTION OF THE DRAWINGS

FIG. 7b is a schematic sectional view taken along line C-C in FIG. 7a;

FIG. 19b is a schematic sectional view taken along line G-G in FIG. 19a;

FIG. 24b is a schematic sectional view taken along line H-H in FIG. 24a;

FIG. 28b is a schematic sectional view taken along line I-I in FIG. 28a;

DETAILED DESCRIPTION OF THE EMBODIMENTS

Figure 1:
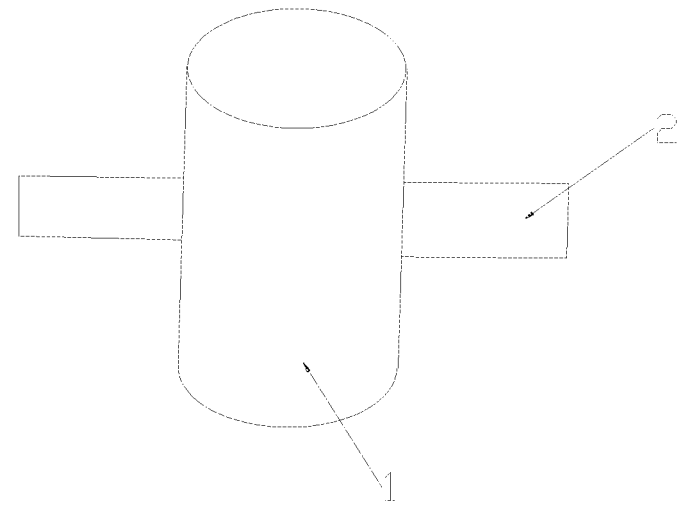
FIG. 1 is a schematic structural view showing a solution in conventional technology.
Figure 2:
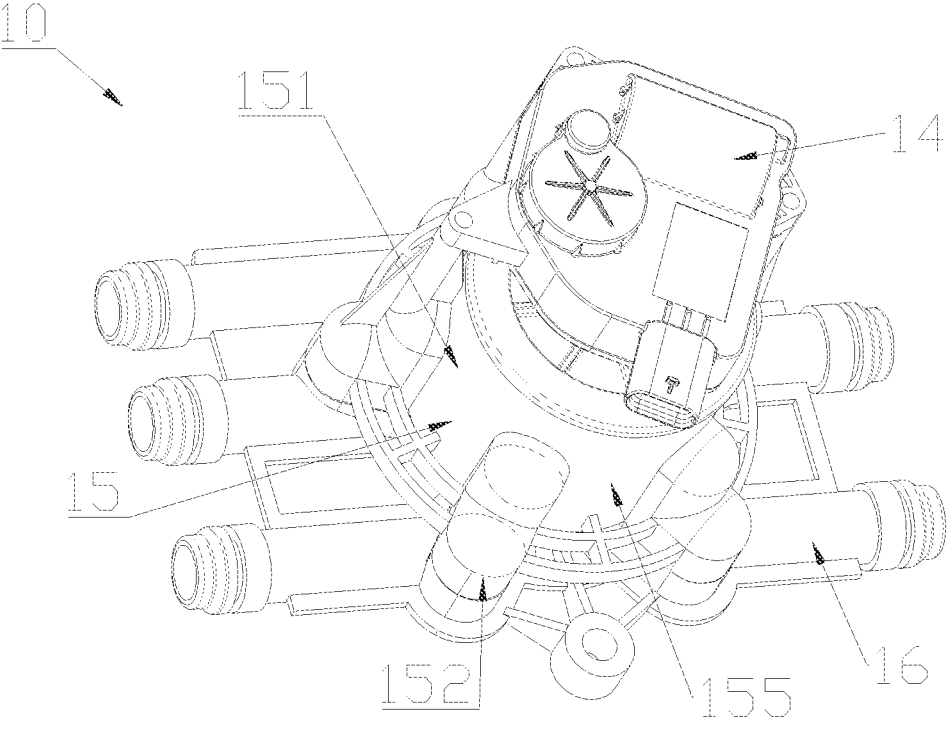
FIG. 2 is a schematic view showing the structure of a fluid control device according to an embodiment of the present application.

The specific technical solutions where the structures of the present application are applied are described in detail as exemplary embodiments.

As an embodiment, referring to FIG. 2 to FIG. 8, a schematic structural view of a fluid control device 10 is shown. The fluid control device 10 may be used for switching flow channels. The fluid control device 10 includes a fluid control assembly 11 and a flow channel connecting portion 16, the fluid control assembly 11 mainly includes a valve core component 12 (shown in FIG. 5), a valve body component 15 and a control component 14. The fluid control assembly 11 has a valve cavity, and at least part of the valve core component 12 is located in the valve cavity. The control component 14 can control the movement of the valve core component 12 in the valve cavity, via the movement of the valve core component 12, the valve core component 12 can rotate or move, to realize communication or switching between the flow channels of the fluid control device.

The fluid control device provided by the embodiments of the present application is not limited to valves, but also may be pumps, heat exchangers and other devices applied to fluid control systems. The fluid control device may also be an integrated component with multiple functions, such as an integrated component of heat exchanger and valve, an integrated component of valve and pump, or an integrated component of pump and heat exchanger.

For example, the fluid control device 10 may have two connecting ports, the communication or non-communication between the flow channels of the two connecting ports can be realized by the movement of the valve core component 12; for example, the fluid control device 10 may have three connecting ports, two of the connecting ports may be selected to be in communication with each other through the movement of the valve core component 12; for example, the fluid control device 10 may also have four or more connecting ports, the movement of the valve core component 12 can realize the communication between the flow channels of different connecting ports, thus realizing the function of switching and communication of the flow channels.

The valve body component 15 has a body portion 151 and a protruding portion 152, the body portion 151 forms at least part of a peripheral wall of the valve cavity, the protruding portion 152 protrudes from a peripheral wall 155 of the body portion 151; the fluid control device is provided with a first flow channel 13 (shown in FIG. 5), the first flow channel 13 is located inside the body portion 151; the protruding portion 152 is provided with two or more second flow channels 156, and the second flow channels 156 can be in communication with the first flow channel 13; the protruding portion 152 is provided with two or more lugs 157, the lug 157 is provided with the second flow channel 156, communication ports 1561 of the second flow channels 156 of at least part of the lugs 157 face the flow channel connecting portion 16. In this embodiment, the communication ports 1561 of the second flow channels 156 of all the lugs 157 face the flow channel connecting portion 16; the flow channel connecting portion 16 is provided with two or more third flow channels 161, the second flow channels 156 and the third flow channels 161 are correspondingly communicated, the second flow channel 156 and the correspondingly third flow channel 161 which are in communication with each other are arranged in a sealed manner, and the flow channel connecting portion 16 and the valve body component 15 are arranged in a sealed manner. The communication ports 1561 of at least part of the second flow channels 156 face the same direction and located in the same plane, which is convenient for the mounting of the fluid control assembly 11.

In this way, the communication ports 1561 of the second flow channels of the valve body component 15 can be in communication with the third flow channels 161 of the flow channel connecting portion 16, and both the fluid inlet and outlet of the fluid control device 10 are arranged at the flow channel connecting portion 16, flow guiding and flow distribution of the of the flow channels can be realized by the flow channel connecting portion 16, and external pipelines or channels can be connected with the flow channel connecting portion 16, which facilitates the arrangement of the connecting pipelines, and the overall structure is compact.

In some embodiments, the flow channel connecting portion 16 is integrally formed by injection molding, the body portion 151 and the protruding portion 152 are integrally formed by injection molding, and the flow channel connecting portion 16 and the protruding portion 152 are fixed by welding. The flow channel connecting portion 16 may be made of plastic material and formed by injection molding, the valve body component 15 may also be made of plastic material and formed by injection molding, and the flow channel connecting portion 16 and the protruding portion 152 may be welded by plastic welding. With the integral injection molding of the flow channel connecting portion 16, the integral injection molding of the valve body component 15, and the flow channel connecting portion 16 and the valve body component 15 being fixed by welding, the processing is simple. In some embodiments, the communication ports 1561 of the second flow channels 156 face the same direction and located in the same plane, the communication ports 1618 (shown in FIG. 8) of the third flow channels 161 are located in the same plane, the plane where the communication ports 1561 of the second flow channels 156 are located and the plane where the communication ports 1618 of the third flow channels 161 are located are fixed by welding.

An axial direction of the body portion 151 is taken as an axial direction H of the valve body component 15, at least part of the protruding portion 152 protrudes from the body portion 151 along a radial direction D of the valve body component 15, each of the lugs 157 has an end part 1571, the end part 1571 faces the flow channel connecting portion 16, and the communication port 1561 of the second flow channel 156 is arranged in the end part; the end part 1571 has a bottom end face 1575, in a radial cross section parallel to the valve body component 15, the bottom end faces 1575 of at least two lugs 157 are located in the same cross section. The at least two bottom end faces 1575 are arranged in the same cross section, which facilitates sealing and fixation with the flow channel connecting portion 16. The sealing of the communication ports 1561 of at least two second flow channels with the third flow channels 161 can be realized by sealing and fixing one cross section, which is more convenient for sealing operation, structure optimization and assembly.

Figure 3:
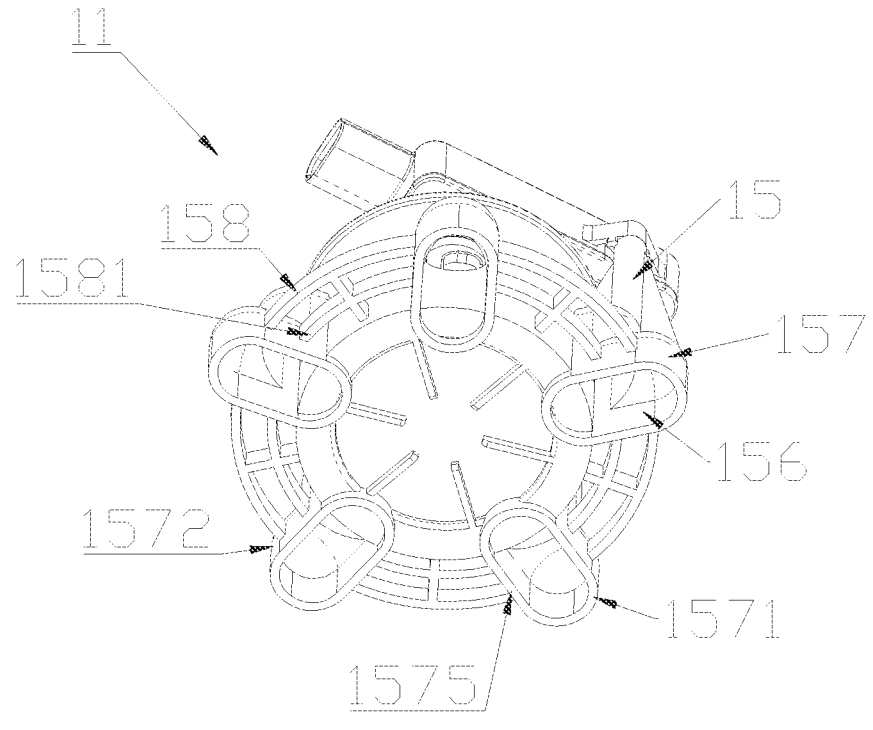
FIG. 3 is a schematic view showing the structure of a valve body component in FIG. 2.
Figure 4:
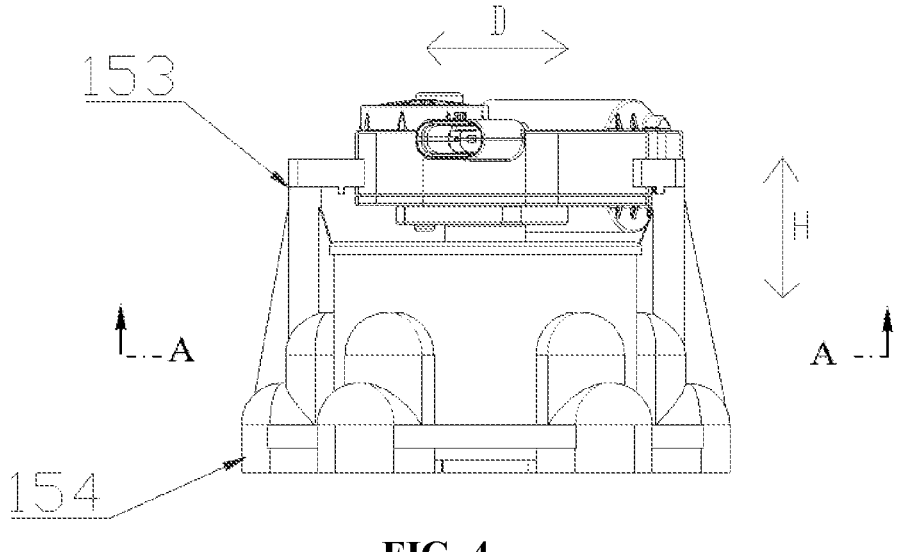
FIG. 4 is a partial schematic view showing the structure of a fluid control assembly in FIG. 2.
Figure 5:
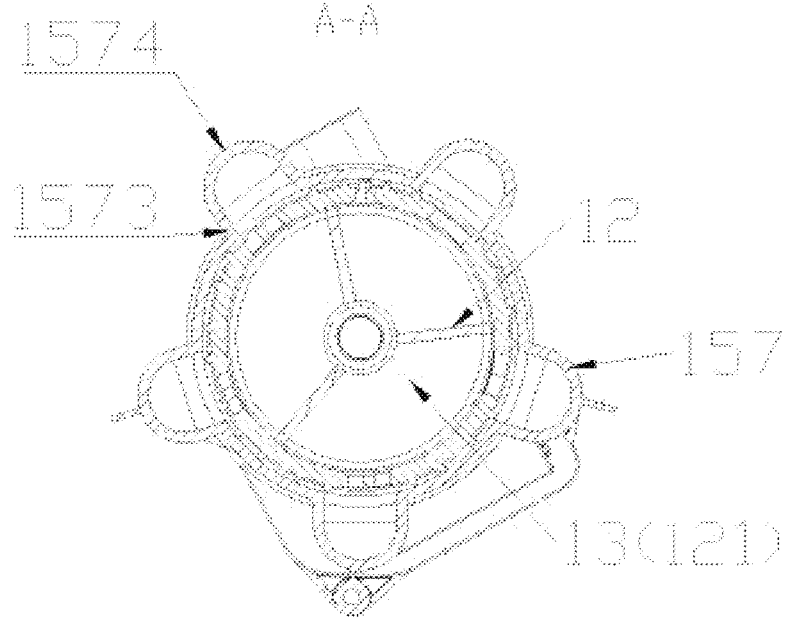
FIG. 5 is a schematic sectional view taken along line A-A in FIG. 4.
Figure 6:
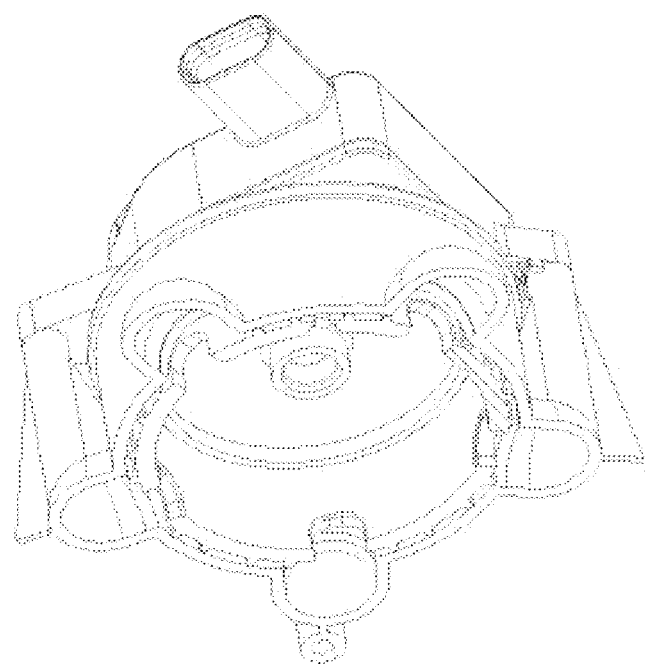
FIG. 6 is a schematic three-dimensional sectional view showing the structure of FIG. 5 from another perspective.
Figure 7A:
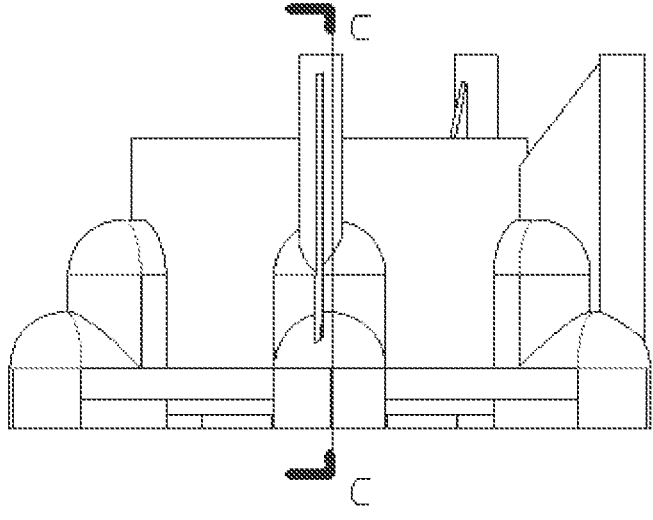
FIG. 7a is a side view of the valve body component in FIG. 2.
Figure 7B:
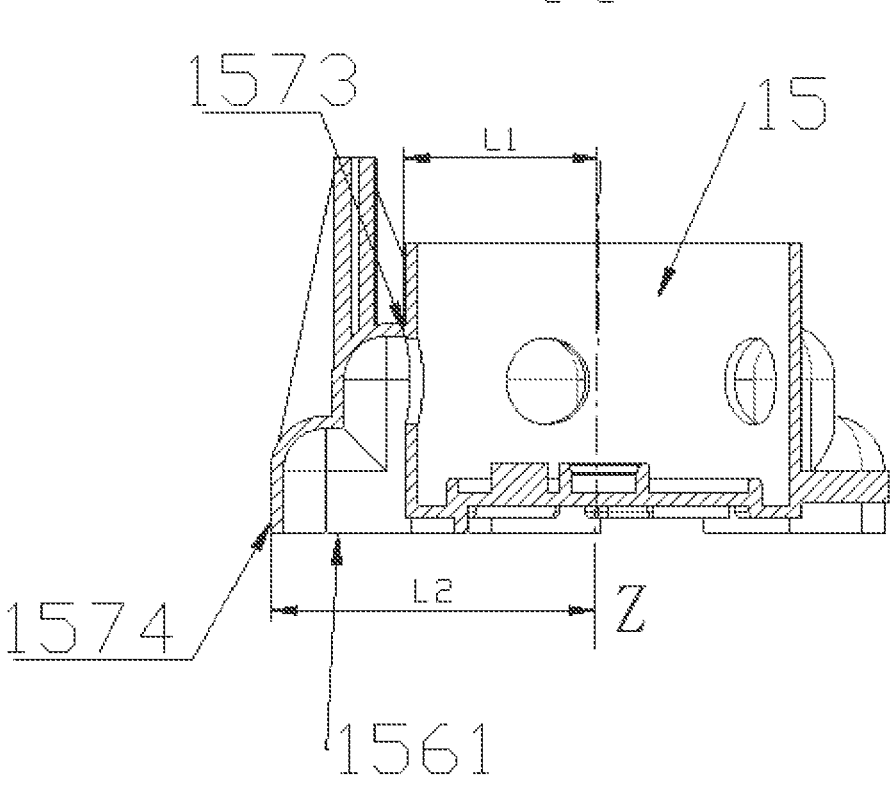

In this embodiment, referring to FIG. 3 to FIG. 5, the protruding portion 152 has five lugs 157, which are arranged along a circumferential direction of the body portion 151, each lug 157 is provided with an end part 1571, each end part 1571 is provided with a bottom end face 1575, the five bottom end faces 1575 are in the same cross section parallel to a radial cross section of the valve body component 15. The flow channel connecting portion 16 can be fixed to the five bottom end faces 1575 locate at the same cross section by welding at the same time, which simplifies the assembly process and reduces the production costs.

In this embodiment, the five lugs 157 are spaced apart, and the end parts 1571 thereof are also spaced apart. Alternatively, in some embodiments, the lugs 157 may be provided next to each other.

In this specification, the term "protruding from the body portion 151 in the radial direction of the valve body component 15" means that the protruding portion 152 is provided with a part protruding from the body portion 151 in the radial direction of the valve body component 15, which is not limited to that the whole protruding portion 152 protrudes from the body portion 151 in the same radial direction, herein, protruding from the body portion 151 in the radial direction means that there is a part protruding in the radial direction relative to the peripheral wall 155 of the body portion 151.

The protruding portion 152 is provided with a connecting portion 158, which is located between adjacent lugs 157 and connects the outer walls 1572 of the adjacent lugs 157. The connecting portion 158 can increase the mechanical strength of the lugs 157, which is helpful to improve the stability when the valve body component 15 and the flow channel connecting portion 16 are assembled.

The connecting portion 158 has a bottom end face 1581, the bottom end surface of the connecting portion 158 may be in the same cross section as the bottom end face 1575 of the lug 157, the connecting portion 158 may be fixed with the flow channel connecting portion 16 by welding, and when the bottom end face 1575 of the lug 157 is welded with the flow channel connecting portion 16, the connecting portion 158 may also be fixed with the flow channel connecting portion 16 by welding, which is helpful to improve the firmness of the welding between the lugs 157 and the flow channel connecting portion 16.

In a longitudinal cross section where the axis of the body portion 151 is located, the lugs 157 each has a root portion 1573 and an outer edge portion 1574, the communication port 1561 of the second flow channel 156 is located between the root portion 1573 and the outer edge portion 1574.

In a radial cross section of the body portion 151, a distance between at least part of the outer edge portion 1574 and the axis of the body portion 151 is greater than a distance between the corresponding root portion 1573 and the axis of the body portion 151.

In this embodiment, the root portion 1573 extends from the peripheral wall 155 of the valve body component 15 in a direction away from the valve cavity, and the root portion 1573 extends along the axial direction of the body portion 151, the end part 1571 of the root portion 1573 forms part of a wall of the communication port 1561 of the second flow channel.

Since the distance between each of at least part of the outer edge portions 1574 and the axis of the body portion 151 is greater than the distance between the corresponding root portion 1573 and the axis of the body portion 151, the lug 157 can be conveniently connected with the flow channel connecting portion 16, and the bottom end faces 1575 of lugs 157 can be located in the same plane when needed, which is convenient for the structural design of the flow channel connecting portion 16. When customers have different needs, a fluid control assembly 11 may be adapted to flow channel connecting portions 16 with different forms of connecting ports, to meet the needs of customers, so as to realize the standardized production of the fluid control assembly 11, and thereby reducing the cost.

In this embodiment, the valve body component 15 has a cylindrical structure, and the valve body component is provided with a first end 153 and a second end 154 in the axial direction of the valve body component 15; the control component 14 is located at a side where the first end 153 is located, and the lugs each 157 protrudes from the second end 154. The flow channel connecting portion 16 is assembled with the second end 154 of the valve body component 15, the structure is simple, which facilitates the connection between the lugs 157 and the flow channel connecting portion 16, and the connection structure is more compact.

In this embodiment, the communication port 1618 of each third flow channel 161 faces the valve body component 15, the communication port 1618 of each third flow channel 161 and the communication port 1561 of each second flow channel are correspondingly arranged, the number of third flow channels 161 of the flow channel connecting portion 16 is the same as the number of the second flow channels 156, and the second flow channels 156 and the third flow channels 161 are in one-to-one correspondence. The flow channel connecting portion 16 and the valve body component 15 are fixed by welding, in this way, the second flow channels 156 of the valve body component 15 can be adapted to the flow channel connecting portion 16, to be in communication with external pipeline or channels through the flow channel connecting portion 16, which facilitates connection of the structures and is convenient for arrangement and mounting.

Figure 8:
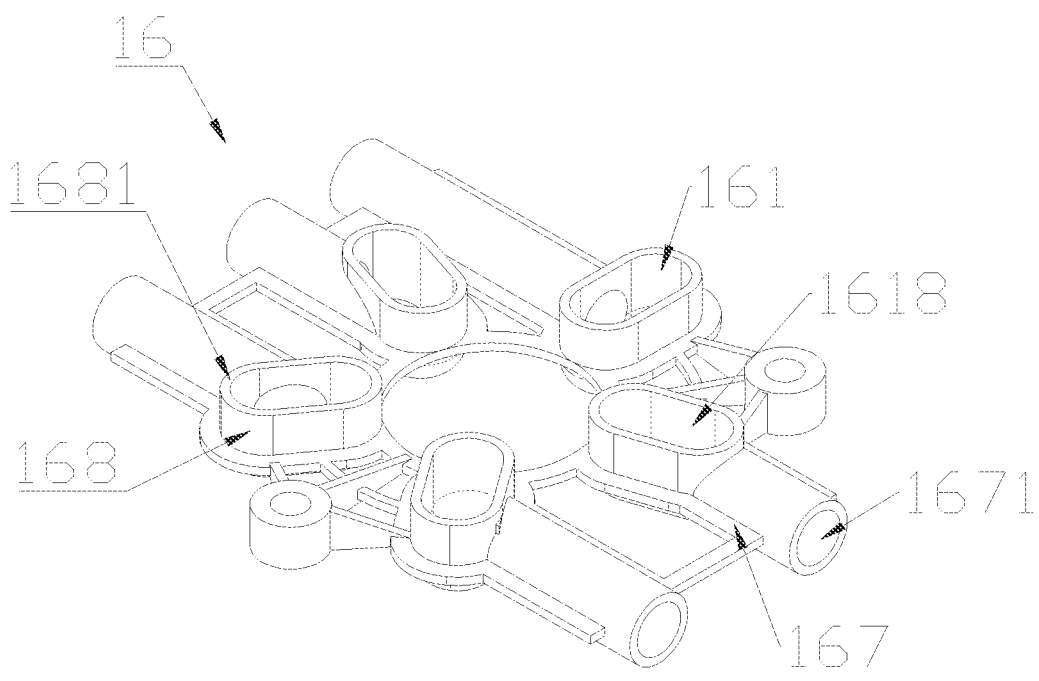
FIG. 8 is a schematic view showing the structure of a flow channel connecting portion in FIG. 2.

Referring to FIG. 8, the flow channel connecting portion 16 has a main body portion 167 and fitting portions 168, the main body portion 167 and the fitting portions 168 are of an integral structure, each of the fitting portions 168 protrudes from the main body portion 167 in an integral manner, the communication port 1618 of the third flow channel 161 are arranged at the corresponding fitting portion 168, the main body portion 167 is provided with connecting hole passages 1671 corresponding to the communication ports 1618 of the third flow channels 161 in number, the flow channel connecting portion 16 may be integrally formed by injection molding. The fitting portion 168 is provided with a welding part 1681, the welding part 1681 surrounds the communication port 1618 of the third flow channel 161, the welding parts 1681 of the fitting portions 168 may be independently provided.

In another embodiment, the main body portion 167 may be further provided with a welding part, the welding part of the main body portion 167 is located between the adjacent fitting portions 168, which is used to improve the welding firmness.

The valve core component 12 may have various kinds of structures, which may be spherical, cylindrical, irregular-shaped, etc. The valve core component may be provided with a hole passage inside or may be provided with a communication groove at a lateral portion thereof, which is not specifically limited in this specification, all kinds of valve core components 12 that have the functions described in this specification are considered to be covered by this specification.

the valve core component 12 is provided with a hole passage or a groove 121, at least part of the first flow channel 13 is located in the hole passage or the groove 121; the valve core component 12 can move relative to the valve body component 15, under different conditions, the hole passage or the groove 121 may be in communication with the corresponding second flow channel 156 in different lugs 157.

Referring to FIG. 9 to FIG. 14, as another embodiment, the structure of a fluid control device 20 is schematically shown in the figures.

The fluid control device 20 includes a fluid control assembly 11 and a flow channel connecting portion 16, the fluid control assembly 11 mainly includes a valve core component 12, a valve body component 15 and a control component 14. The fluid control assembly 11 is provided with a valve cavity, the valve body component 15 forms at least part of a peripheral wall of the valve cavity, at least part of the valve core component 12 is located in the valve cavity.

Most of the structures of the valve body component 15, the valve core component 12 and the control component 14 can refer to the above specific embodiments, and the same structures thereof are not described again.

Figure 11:
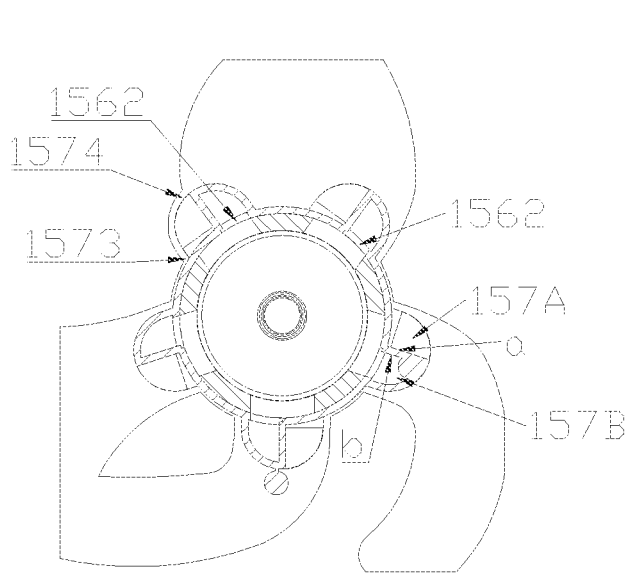
FIG. 11 is a schematic sectional view taken along line D-D in FIG. 10.
Figure 12:
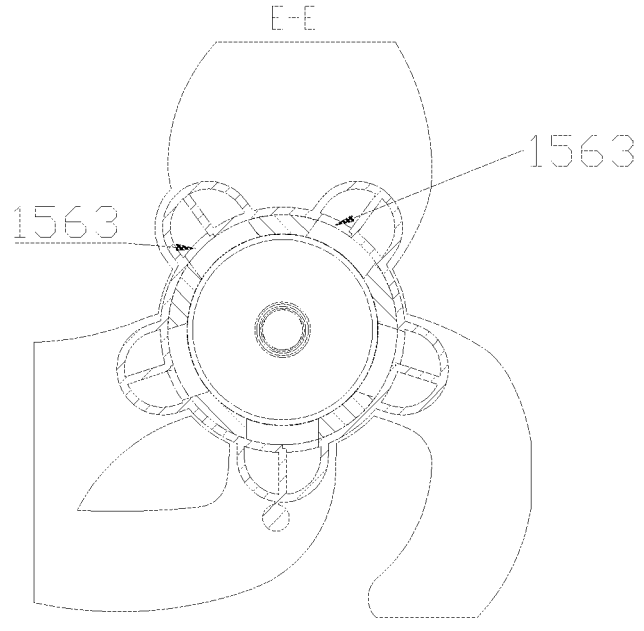
FIG. 12 is a schematic sectional view taken along line E-E in FIG. 10.

Referring to FIG. 11 and FIG. 12, at least two lugs 157 may be arranged adjacent to each other; for the convenience of description, two adjacent lugs 157 are defined as a first lug 157A and a second lug 157B for distinguishing, and a wall between the two lugs 157 is taken as a boundary between the two lugs 157. The wall has two wall surfaces, namely a wall surface "a" and a wall surface "b", the first lug 157A includes the wall surface "a", the second lug 157B includes the wall surface "b", the end part 1571 of the first lug 157A and the end part 1571 of the second lug 157B are also divided by the wall surface "a" and the wall surface "b".

In conjunction with FIG. 8 to FIG. 14, the flow channel connecting portion 16 is integrally formed by injection molding, the communication port 1618 of each third flow channel 161 faces the valve body component 15, the communication port 1618 of each third flow channel 161 and the communication port 1561 of each second flow channel 156 are correspondingly arranged; the number of the third flow channels 161 of the flow channel connecting portion 16 is the same as that of the second flow channels 156, and the second flow channels 156 and the third flow channels 161 are in one-to-one correspondence.

Figure 9:
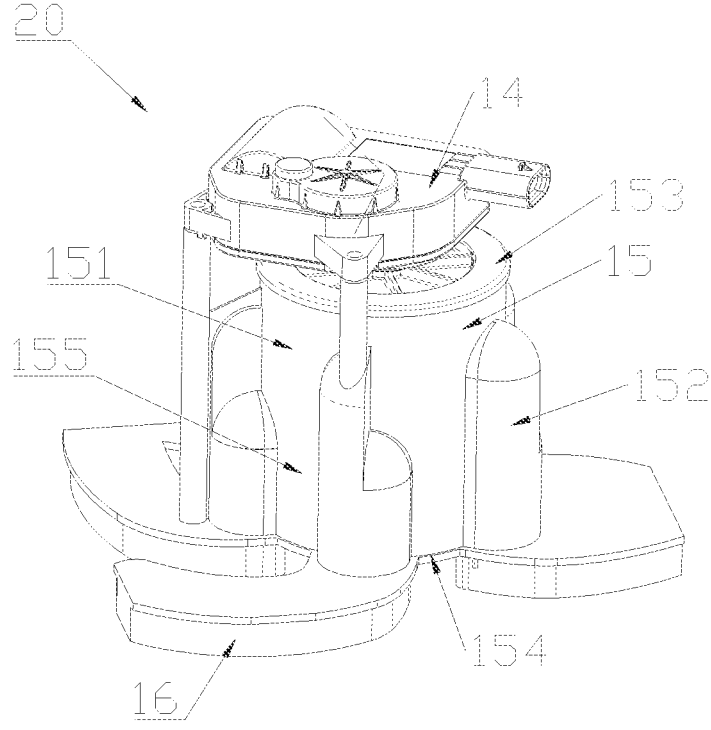
FIG. 9 is a schematic view showing the structure of a fluid control device according to another embodiment of the present application.
Figure 10:
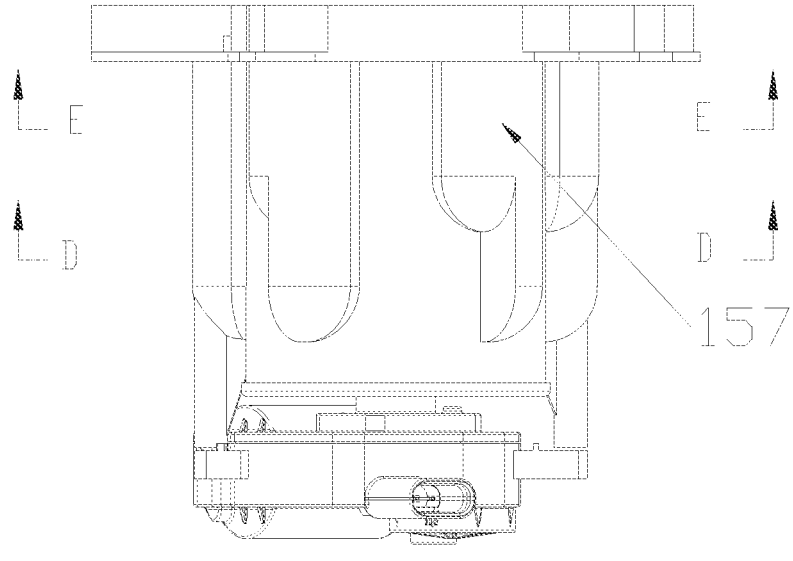
FIG. 10 is a schematic side view of part of the structure in FIG. 9.

In this embodiment, a communication port in communication with the first flow channel 13 and the second flow channel of the first lug 157A is defined as a first communication port 1562, and a communication port in communication with the first flow channel 13 and the second flow channel of the second lug 157B is defined as a second communication port 1563. The first communication port 1562 and the second communication port 1563 do not located at a same radial cross section of the valve body component 15, the radial cross section is a section formed by cutting the valve body component 15 in a direction perpendicular to the axial direction of the valve body component 15. Referring to FIG. 9, FIG. 11 and FIG. 12, the first communication port 1562 and the second communication port 1563 are staggered along the axial direction of the valve body component 15. In this way, the second flow channel 156 of the first lug 157A and the second flow channel 156 of the second lug 157B may have different unblocking flow paths, and the second flow channel 156 of the first lug 157A and the second flow channel 156 of the second lug 157B can be reasonably arranged on the valve body component 15.

In this embodiment, the fluid control assembly 11 is provided with ten lugs 157, the flow channel connecting portion 16 is provided with ten third flow channels 161, the second flow channel 156 of each lug 157 is in communication with the corresponding third flow channel 161. Some of the lugs 157 are adjacent to each other, and some of the lugs 157 are spaced apart. Of course, in other embodiments, the lugs 157 may be all adjacent or all spaced apart, or the number of adjacent lugs 157 is different from that of the present embodiment.

Figure 13:
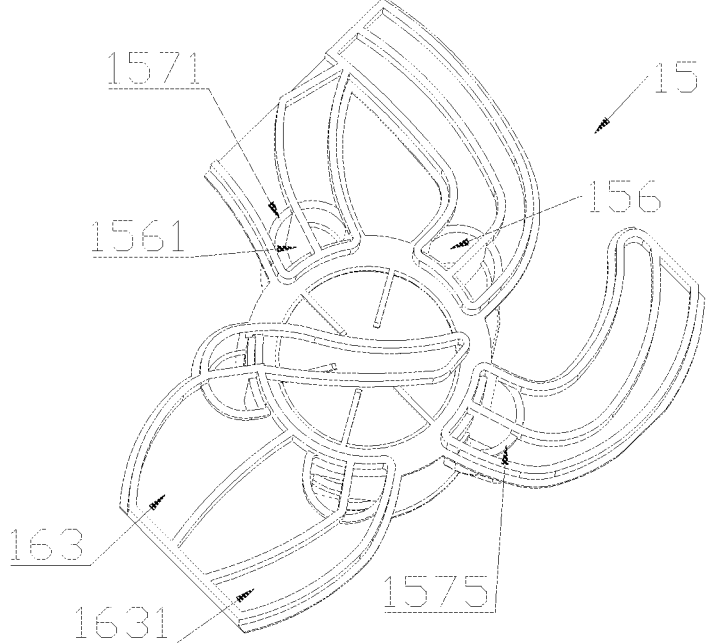
FIG. 13 is a schematic bottom view of the valve body component in FIG. 9.
Figure 14:
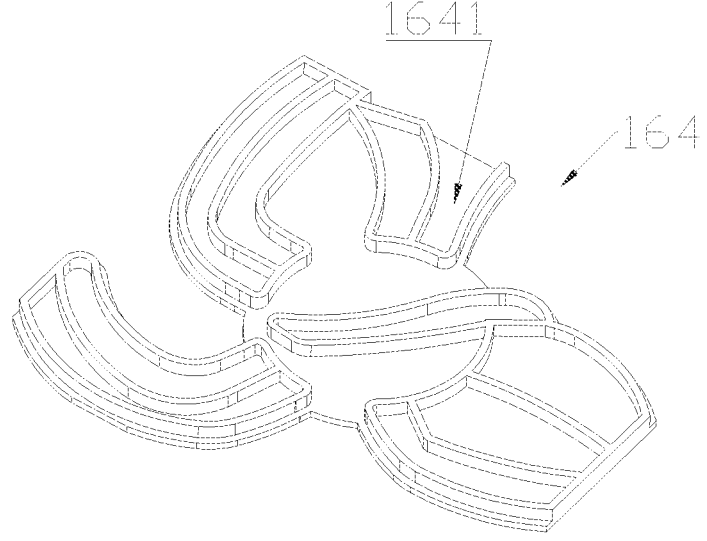
FIG. 14 is a schematic three-dimensional view showing the structure of a flow channel connecting portion in FIG. 9.

In some embodiments, as shown in FIG. 13 and FIG. 14, the flow channel connecting portion 16 includes a first sub-portion 163 and a second sub-portion 164, the first sub-portion 163 is integrated with the body portion 151 and extends from the body portion 151 in a direction away from the valve cavity. The first sub-portion 163 is provided with a first groove 1631, a wall portion corresponding to the first groove 1631 is fixed to the second sub-portion 164 by welding, to form the third flow channel 161. The flow channel connecting portion 16 is designed to include the first sub-portion 163 and the second sub-portion 164, which is beneficial to the flow channel processing of the flow channel connecting portion 16 and facilitates the injection molding.

As shown in FIG. 14, in this embodiment, the second sub-portion 164 is provided with a second groove 1641, and the second groove 1641 is arranged to be corresponding to the first groove 1631, a wall portion corresponding to the second groove 1641 is fixed to the wall portion corresponding to the first groove 1631 by welding. In other embodiments, the first sub-portion 163 may extend from the lug 157 in an integral manner. In other embodiments, the second sub-portion 164 may be a flat plate structure without a second groove 1641, the second sub-portion 164 seals the first groove 1631, and is fixed with the wall portion corresponding to the first groove 1631 by welding.

In other embodiments, the first sub-portion 163 may not be provided with a first groove 1631, the second sub-portion 164 is provided with a second groove 1641, the first sub-portion 163 seals the second groove 1641, and is fixed with the wall portion corresponding to the second groove 1641 by welding. Alternatively, the first sub-portion 163 is provided with the communication port 1618 of the third flow channel 161, the communication ports 1618 of the third flow channels 161 and the communication ports 1561 of the second flow channels 156 are correspondingly arranged, and the first sub-portion 163 is fixed to the valve body component 15 by welding.

The valve body component 15 has a cylindrical structure, the valve body component 15 has a first end 153 and a second end 154 in the axial direction of the valve body component 15, the fluid control assembly 11 is provided with a control component 14, the control component 14 is located at a side where the first end 153 is located, the lug 157 protrudes from the second end 154, the first sub-portion 163 is located at the second end 154, the second sub-portion 164 and the first sub-portion 163 are assembled at the second end 154 of the valve body component 15, thus the structure is simple, which facilitates the connection between the lugs 157 and the flow channel connecting portion 16, and the connection structure is more compact.

It should be noted that the shape of the flow channels of the flow channel connecting portion 16 may be designed in various type, and this embodiment is only taken as an example.

Figure 15:
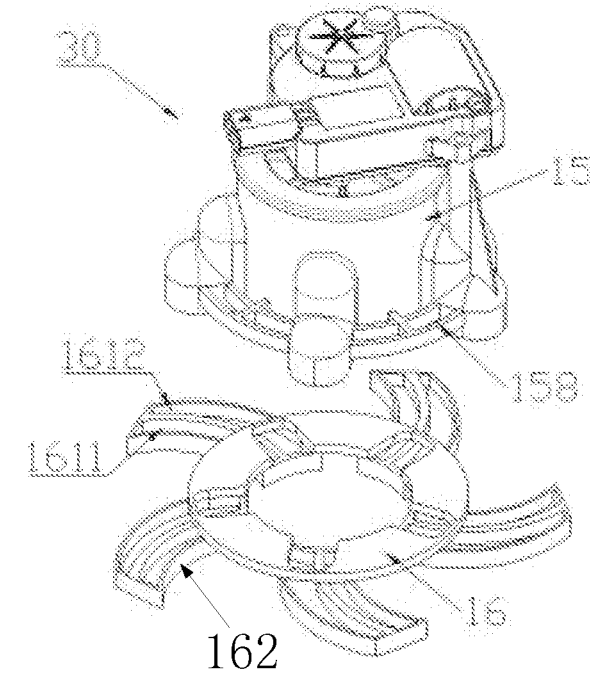
FIG. 15 is a partially exploded schematic three-dimensional view showing the structure of a fluid control device according to yet another embodiment of the present application.
Figure 16:
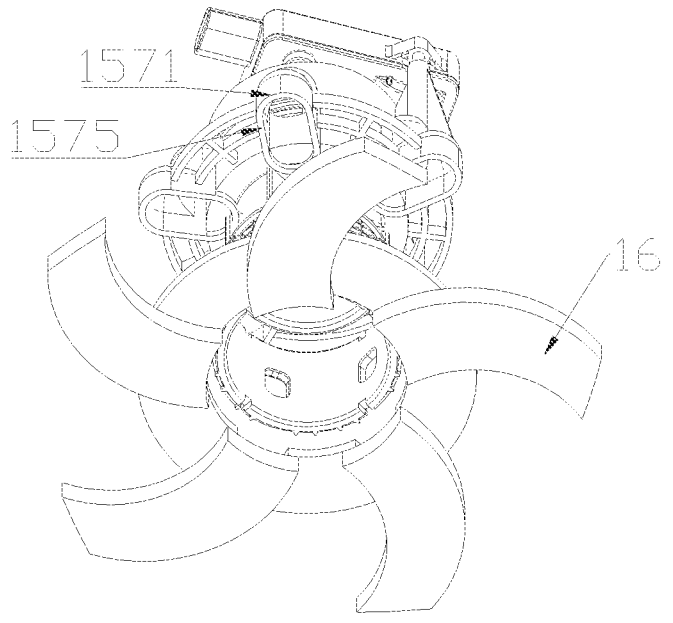
FIG. 16 is a schematic structural view of FIG. 15 from another perspective.

Referring to FIG. 15 and FIG. 16, which are schematic views showing the structure of another fluid control device 30. The fluid control device 30 includes a fluid control assembly 11 and a flow channel connecting portion 16, the fluid control assembly 11 mainly includes a valve core component 12, a valve body component 15 and a control component 14. Most of the structures of the valve body component 15, the valve core component 12 and the control component 14 are the same as or similar to those of the fluid control device 10, which are not described again. The difference is at least that the structure of the flow channel connecting portion 16 is different from the structure of the fluid control device 10 shown in FIG. 1 to FIG. 8.

The flow channel connecting portion 16 is integrally formed by injection molding, the body portion 151 and the protruding portion 152 are integrally formed by injection molding, and the flow channel connecting portion 16 and the protruding portion 152 are fixed by welding.

In a longitudinal cross section where the axis of the body portion 151 is located, the lug 157 is provided with a root portion 1573 and an outer edge portion 1574, the communication port 1561 of the second flow channel is located between the root portion 1573 and the outer edge portion 1574; that is, the root portion 1573 and the outer edge portion 1574 are part of the wall corresponding to the communication port 1561 of the second flow channel.

In a radial cross section of the body portion 151, a distance L2 between at least part of the outer edge portion 1574 and the axis Z of the body portion 151 is greater than a distance L1 between the corresponding root portion 1573 and the axis Z of the body portion 151.

The root portion 1573 extends from the peripheral wall 155 of the valve body component 15, and the root portion 1573 extends along the axial direction of the body portion 151, the end part 1571 of the root portion 1573 forms a part of a wall of the communication port 1561 of the second flow channel. The distance between at least part of the outer edge portion 1574 and the axis of the body portion 151 is greater than the distance between the root portion 1573 and the axis of the body portion 151, which facilitates connection between the lugs 157 and the flow channel connecting portion 16, and the bottom end faces 1575 of the lugs 157 can be located in the same plane when needed, which is convenient for the structural design of the flow channel connecting portion 16. When customers have different needs, a fluid control assembly 11 may be adapted to flow channel connecting portions 16 with different forms of connecting ports, to meet the needs of customers, so as to realize the standardized production of the fluid control assembly 11, and thereby reducing the cost.

In this embodiment, the communication port 1618 of each of third flow channels 161 faces the valve body component 15, at least one of the third flow channels 161 of the flow channel connecting portion 16 has a third flow channel first portion 1611 and a third flow channel second portion 1612, the third flow channel first portion 1611 and the third flow channel second portion 1612 are independently arranged at the flow channel connecting portion 16, and are in communication with the same second flow channel 156.

In this embodiment, the fluid control assembly 11 has five lugs 157, each lug 157 is provided with the second flow channel 156. The flow channel connecting portion 16 is provided with five flow guide portions 162, and the flow guide portions 162 and the lugs 157 are correspondingly arranged. Each flow guide portion 162 has the third flow channel first portion 1611 and the third flow channel second portion 1612 which are independently arranged, the fluid can flow independently in the third flow channel first portion 1611 and the third flow channel second portion 1612. In this way, the second flow channel 156 of each lug 157 can form two sub-flow channels through adapting by the flow channel connecting portion 16, and in the case that the fluid control assembly 11 is provided with five flow channels, the five flow channels form ten flow channels through adapting by the flow channel connecting portion 16, which is suitable for the system that needs ten connecting ports for flow channel switching in the vehicle thermal management system.

Figure 17:
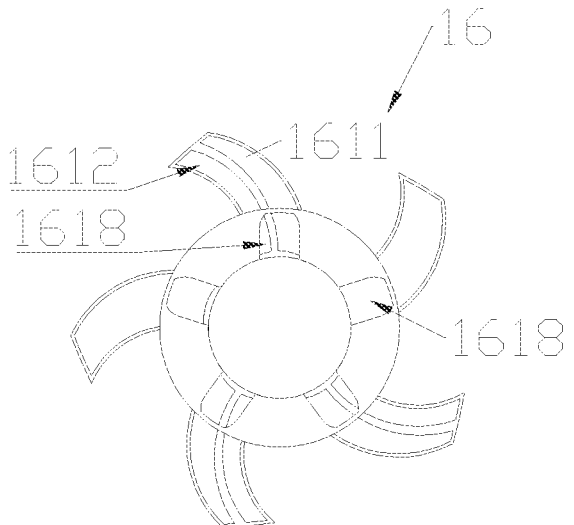
FIG. 17 is a schematic view showing the structure of another solution of a flow channel connecting portion.

In other embodiments, referring to FIG. 17, which is a schematic view showing the structure of a flow channel connecting portion 16. It is not necessary that every flow guide portion has the third flow channel first portion 1611 and the third flow channel second portion 1612, instead, it is feasible that one or two or three or four of the flow guide portions have the above two parts of the third flow channel, hence, the fluid control assembly 11 according to this embodiment may be used in the cases that the vehicle management system has 5, 6, 7, 8, 9 or 10 connecting ports.

In other embodiments, in a case that the connecting ports are less than 5, the second flow channels 156 of two of the lugs 157 of the valve body component 15 can be arranged for flow mixings on the flow channel connecting portion 16; that is, the flow channel connecting portion 16 can also realize the channel switching requirements of the case that there're 4 connecting ports. The above number of connecting ports is only exemplary, and can be adjusted according to the actual situation.

Figure 20:
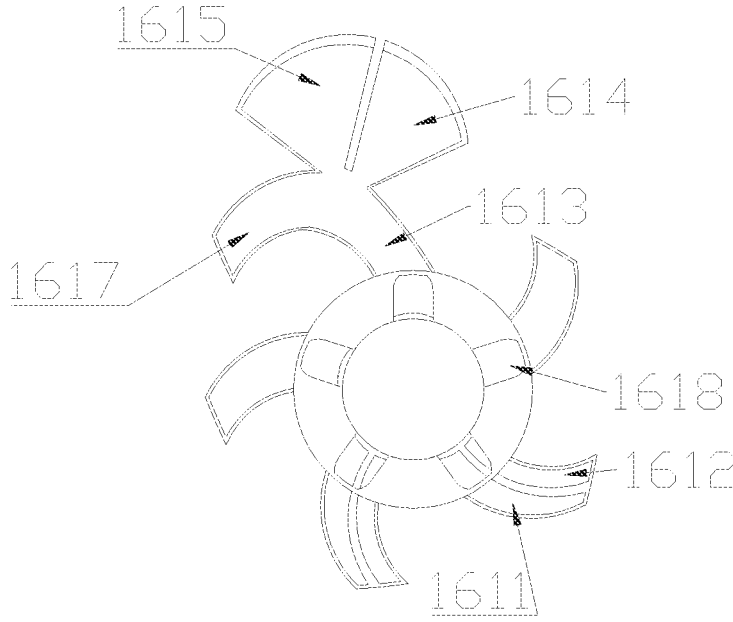
FIG. 20 is a schematic view showing the structure of yet another solution of a flow channel connecting portion.

In other embodiments, reference is made to FIG. 20, which is a schematic view showing the structure of another flow channel connecting portion 16.

The communication ports 1618 of the third flow channels 161 of the flow channel connecting portion 16 and the communication ports 1561 of the second flow channels are correspondingly arranged. The third flow channel 161 is provided with a trunk section 1613, a first branch section 1614, a second branch section 1615 and a third branch section 1617, the communication port 1618 of the third flow channel 161 is located at the trunk section 1613, the first branch section 1614, the second branch section 1615, and the third branch section 1617 are respectively connected with the trunk section 1613. In this way, the fluid from a certain second flow channel 156 of the lug 157 enters the third flow channel 161, the fluid from the trunk section 1613 is distributed to the first branch section 1614, the second branch section 1615 and the third branch section 1617, which can meet different system requirements.

Figure 18:
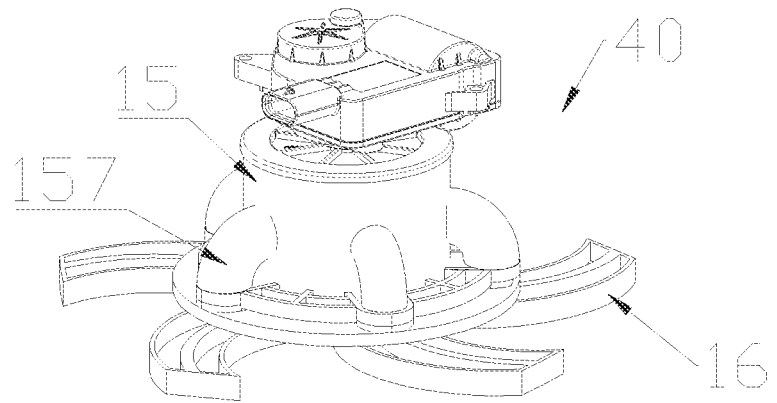
FIG. 18 is a schematic view showing the structure of a fluid control device according to still another embodiment of the present application.
Figure 19A:
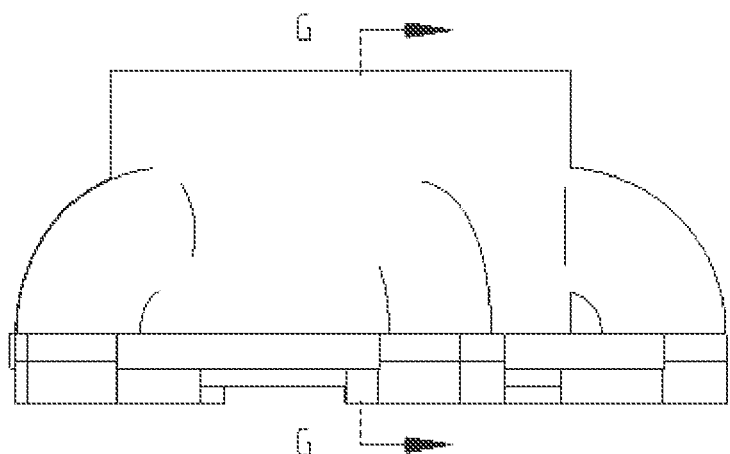
FIG. 19a is a side view of a valve body component in FIG. 18.
Figure 19B:
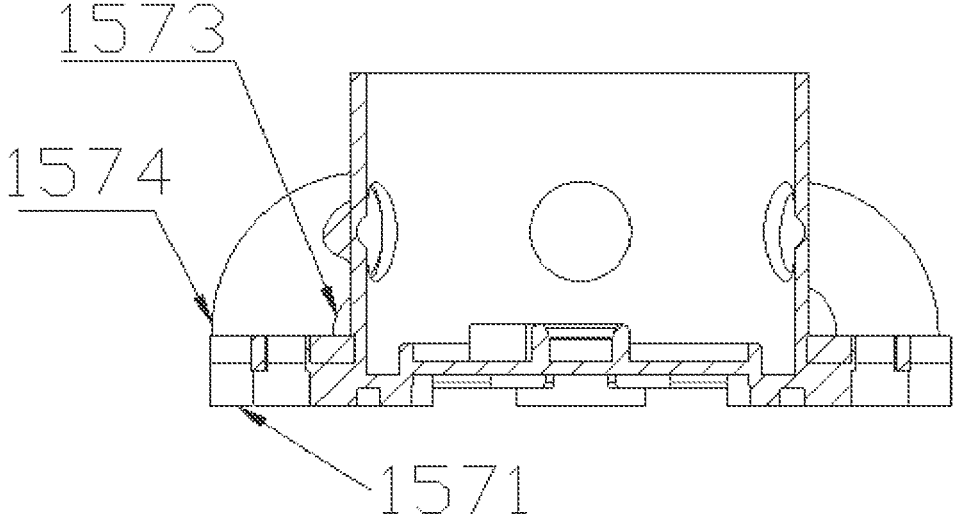

Referring to FIG. 18, FIG. 19a and FIG. 19b, as an embodiment, a schematic structural view of a fluid control device 40 is shown.

The fluid control device 40 shown in FIG. 18 is generally similar to the fluid control device shown in FIG. 16. At least the differences lie in the structure of the valve body component 15 and the structure of the flow channel connecting portion 16. In this embodiment, a peripheral wall portion of the lug 157 of the valve body component 15 is spaced apart from the outer peripheral wall of the body portion 151; and along an extension direction of the lug 157, as shown in FIG. 18, the lug 157 extends along a curve, along a direction perpendicular to a flowing direction of the fluid, a cross section of the lug 157 is circular-shaped, which can reduce the flow resistance of the fluid flowing in the lug 157. In this case, the lug 157 and the body portion 151 may be fixed by welding and sealingly arranged. The flow channel connecting portion 16 is provided with a main body portion 167 and a fitting portion 168 protruding from the main body portion 167; the fitting portion 168 is provided with a welding part 1681, the welding part 1681 is welded with the lug 157. In this embodiment, the valve body component 15 has a cylindrical structure, the valve body component 15 is provided with a first end 153 and a second end 154 in the axial direction of the valve body component 15, the fluid control assembly 11 is provided with a control component 14, the control component 14 is located at a side where the first end 153 is located, the lugs 157 protrude between the first end 153 and the second end 154.

An axial direction of the body portion 151 is taken as an axial direction of the valve body component 15, the protruding portion 152 protrudes from the body portion 151 along a radial direction of the valve body component 15, each lug 157 has an end part 1571, the end part 1571 faces the flow channel connecting portion 16, the communication port 1561 of the second flow channel is arranged at the end part 1571, the end part 1571 has a bottom end face 1575, in a radial cross section parallel to the valve body component 15, at least two of the bottom end faces 1575 are located in the same cross section. At least two bottom end faces 1575 are arranged in the same section, which facilitates sealing and fixing of the bottom end faces with the flow channel connecting portion 16. The sealing of the communication ports 1561 of at least two second flow channels can be realized by sealing and fixing one cross section, which is more convenient for sealing operation, structure optimization and assembly.

In a longitudinal cross section where the axis of the body portion 151 is located, the lug 157 has a root portion 1573 and an outer edge portion 1574, the communication port 1561 of the second flow channel is located between the root portion 1573 and the outer edge portion 1574 In a radial cross section of the body portion 151, a distance between at least part of the outer edge portion 1574 and the axis of the body portion 151 is greater than a distance between the corresponding root portion 1573 and the axis of the body portion 151.

Figure 21:
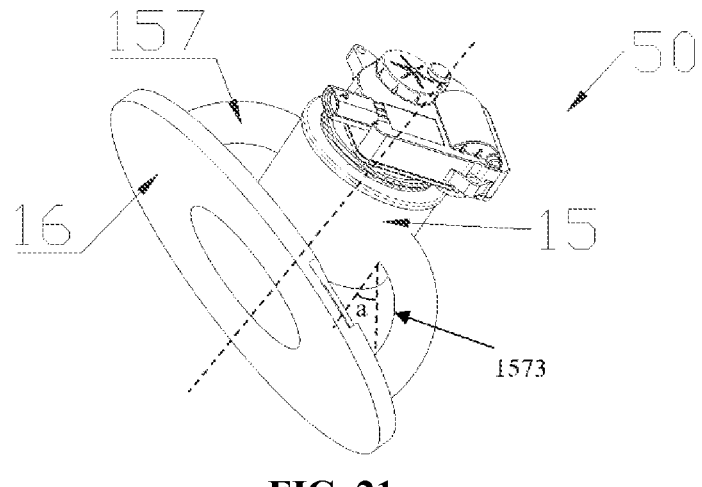
FIG. 21 is a schematic view showing the structure of a fluid control device according to still another embodiment of the present application.
Figure 22:
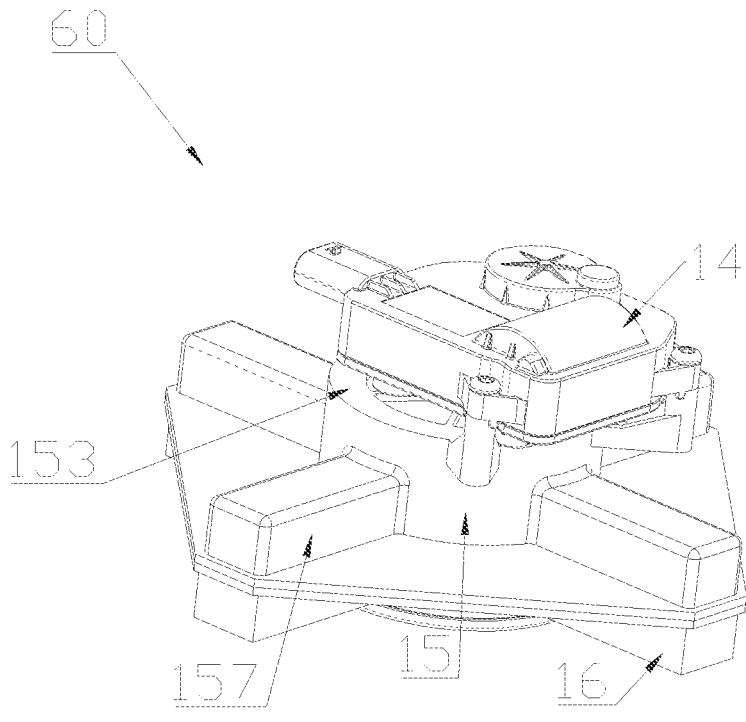
FIG. 22 is a schematic structural diagram of the fluid control device provided by yet another embodiment of the present application.
Figure 23:
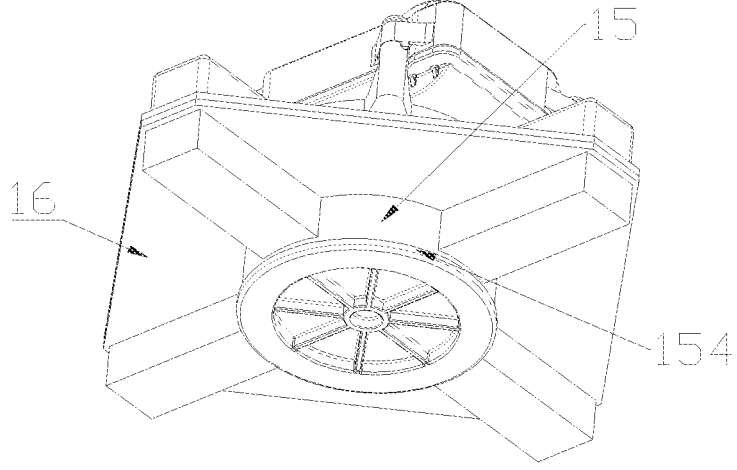
FIG. 23 is a schematic structural view of FIG. 22 from another perspective.

Referring to FIG. 21, which is a view showing the structure of a fluid control device 50, an axial direction of the body portion 151 is taken as an axial direction of the valve body component 15, the lug 157 protrudes from the body portion 151 along a radial direction of the valve body component 15, each lug 157 has an end part 1571, the end part 1571 faces the flow channel connecting portion 16, the communication port 1561 of the second flow channel is arranged at the end part 1571s, the end part 1571 has a bottom end face 1575, in a cross section having an included angle of 0-90 degrees with respect to the axial direction of the valve body component 15, at least two of the bottom end faces 1575 are located in the same cross section.

In other embodiments, the root portion 1573 extends from the peripheral wall 155 of the valve body component 15, and the root portion 1573 extends along the axial direction of the body portion 151, the end part 1571 of the root portion 1573 forms a part of a wall of the communication port 1561 of the second flow channel.

The root portion 1573 extends from the peripheral wall 155 of the valve body component 15, the root portion 1573 extends in a direction having an included angle "a" with respect to the axis of the body portion 151, the included angle "a" between the root portion and the axis of the body portion 151 is (0, 90], that is, 0<a≤90 degrees. In some embodiments, the included angle "a" between the root portion and the axis of the body portion 151 is 90 degrees. The root portion 1573 extends along a radial direction of the body portion 151, an end part of the root portion 1573 forms a part of a wall of the communication port 1561 of the second flow channel 156; in this case, the axial height of the fluid control device can be reduced.

In this specification, in a case where the lug 157 is of a non-linear structure, along an axial direction of the valve body component 15, the connection position between the root portion 1573 and the peripheral wall 155 of the valve body component 15 is defined as a first point, an end of the root portion 1573 farthest from the peripheral wall 155 of the valve body component 15 is defined as a second point, a connecting line is provided between the first point and the second point, and an angle between the connecting line connecting the first point and the second point and the axis of the body portion 151 is defined as the included angle "a". In case that the included angle "a" is 90 degrees, the plane where the bottom end face 1575 of the lug 157 is located is parallel to the axial direction of the valve body component 15, in this case, the connection manner between the protruding portion 152 and the flow channel connecting portion 16 may refer to the connection manner of any of the above embodiments; for example, the protruding portion 152 may be fixed with the flow channel connecting portion 16 by welding, or in a case that the flow channel connecting portion 16 is provided with a sub-portion, the sub-portion and the protruding portion 152 are welded or formed into an integral structure.

Referring to FIG. 22 to FIG. 25, the structure of another fluid control device 60 is shown. The fluid control device 60 includes a fluid control assembly 11 and a flow channel connecting portion 16, the fluid control assembly 11 mainly includes a valve core component 12, a valve body component 15 and a control component 14. Most of the structures of the fluid control device 60 may refer to the fluid control device 10.

The valve body component 15 has a cylindrical structure, the valve body component 15 is provided with a first end 153 and a second end 154 in the axial direction of the valve body component 15, the fluid control assembly 11 is provided with the control component 14, the control component 14 is located at a side where the first end 153 is located, and the lugs 157 protrude between the first end 153 and the second end 154.

Figure 24A:
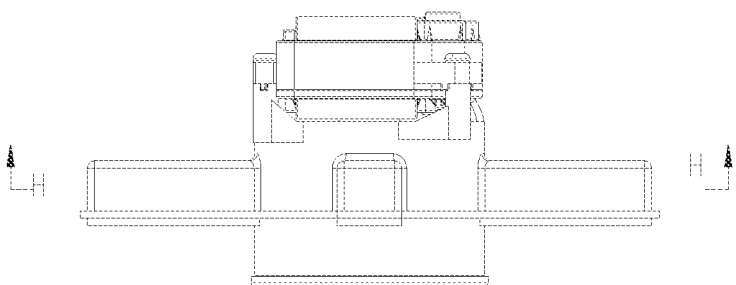
FIG. 24a is a side view of a fluid control assembly of FIG. 23.
Figure 24B:
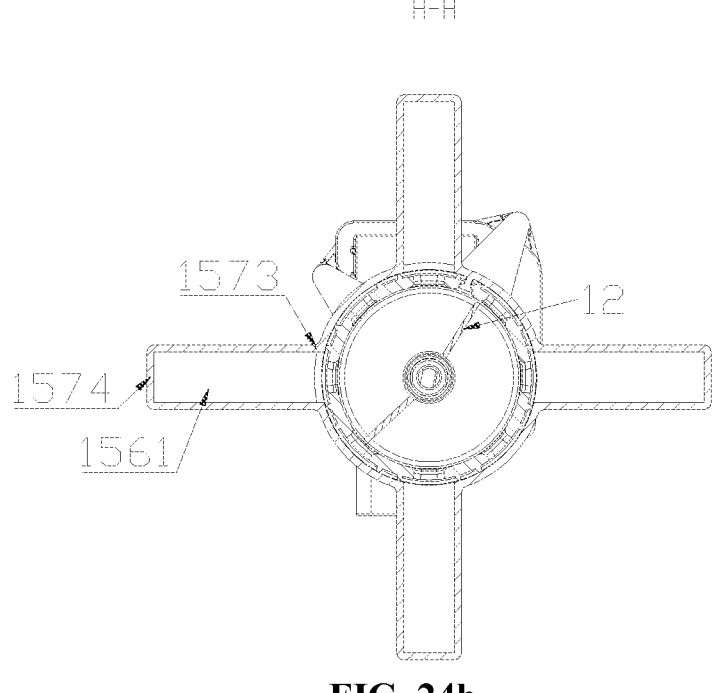
Figure 25:
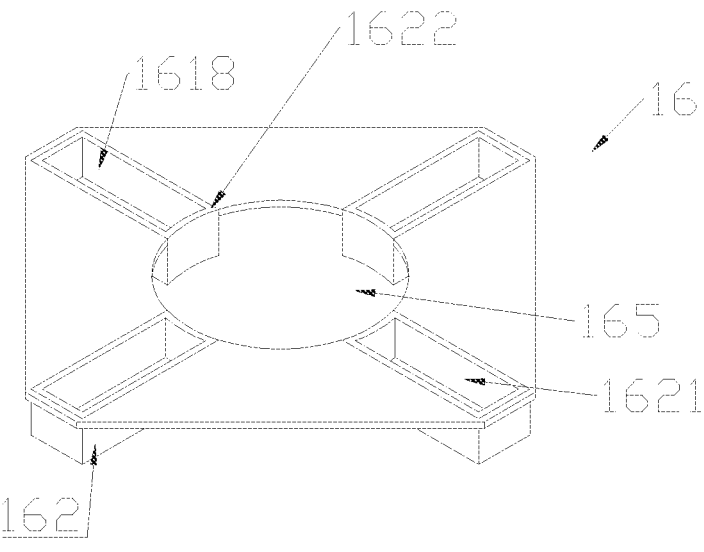
FIG. 25 is a schematic view showing the structure of a flow channel connecting portion in FIG. 24.
Figures 26, 27:
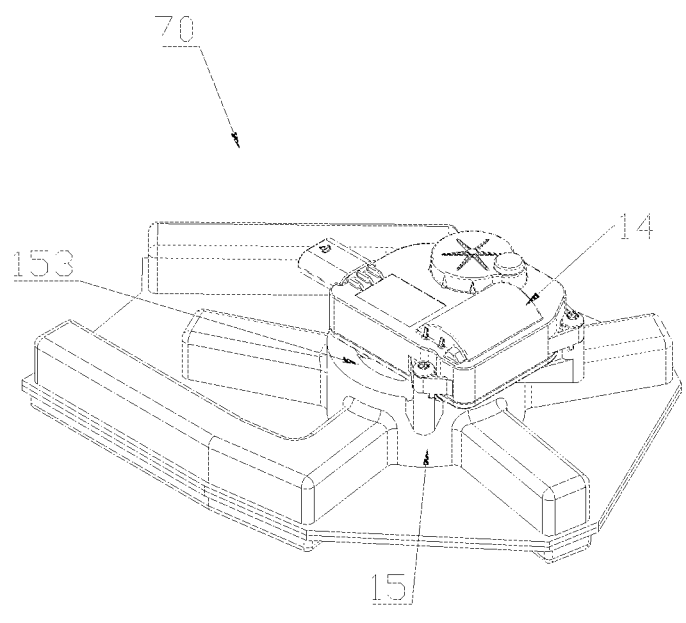
FIG. 26 is a schematic view showing the structure of a fluid control device according to still another embodiment of the present application.
FIG. 27 is a schematic view of FIG. 26 from another perspective.
Figure 28A:
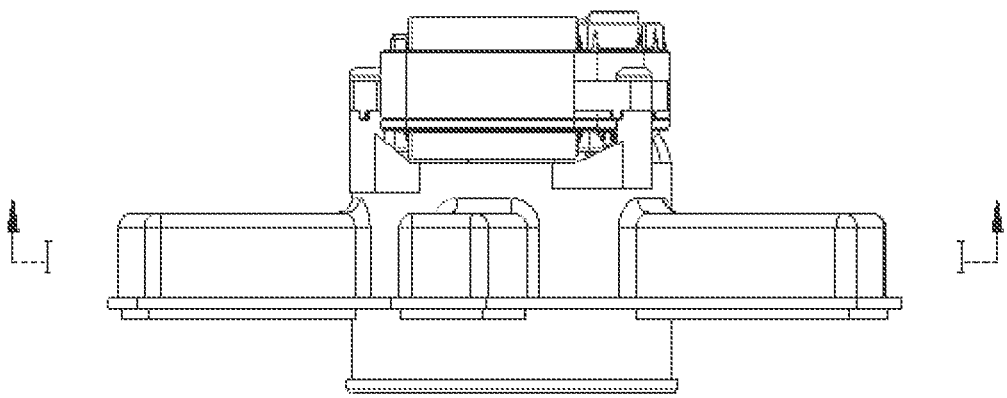
FIG. 28a is a side view of a fluid control assembly of FIG. 27.
Figure 28B:
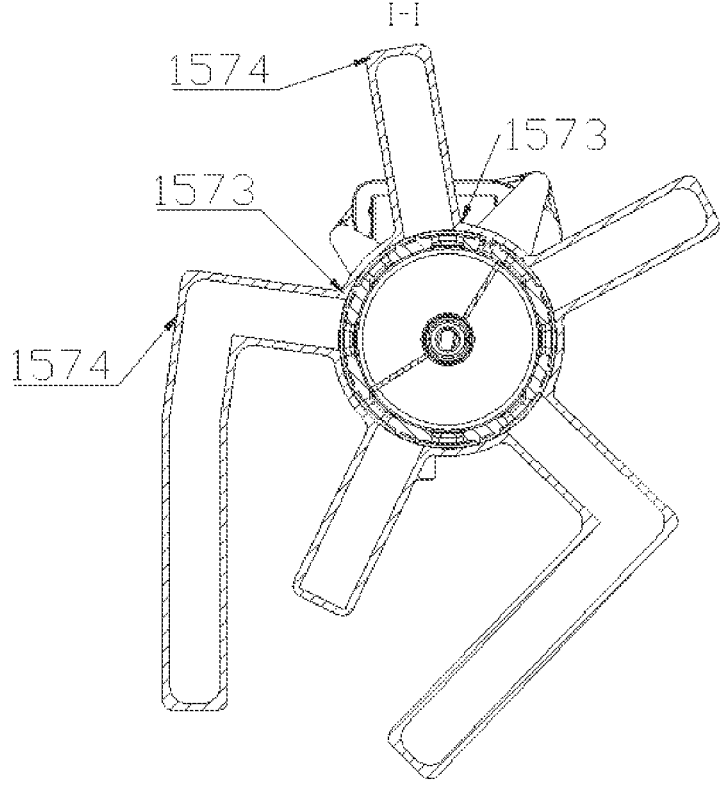
Figure 29:
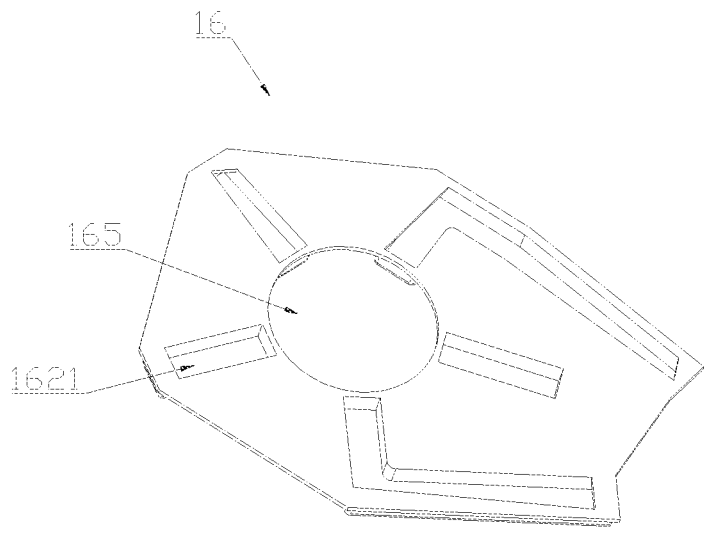
FIG. 29 is a schematic view showing the structure of a flow channel connecting portion in FIG. 27.

As shown in FIG. 24a and FIG. 24b, the communication ports 1561 of the second flow channels 156 are located in a radial cross section between the first end 153 and the second end 154, where the radial cross section is a cross section obtained by cutting the lug 157 in a direction perpendicular to the axis of the valve body component 15. In a longitudinal section where the axis of the body portion 151 is located, the lug 157 is provided with a root portion 1573 and an outer edge portion 1574, the communication port 1561 of the second flow channel is located between the root portion 1573 and the outer edge portion 1574; in a radial cross section of the body portion 151, a distance between at least part of the outer edge portion 1574 and the axis of the body portion 151 is greater than a distance between the corresponding root portion 1573 and the axis of the body portion 151.

In this embodiment, the root portion 1573 extends from the peripheral wall 155 of the valve body component 15 in a direction away from the valve cavity, and the root portion 1573 extends along an axial direction of the body portion 151, the end part 1571 of the root portion 1573 forms a part of a wall of the communication port 1561 of the second flow channel.

The flow channel connecting portion 16 is provided with a notch 165, and part of the valve body component 15 is located in the notch 165. In this way, the flow channel connecting portion 16 may protrude on a peripheral side of the valve body component 15, so that an overall height of the fluid control device is relatively small. The communication port 1561 of the second flow channel of the valve body component 15 can be in communication with the third flow channel 161 of the flow channel connecting portion 16, the flow channel connecting portion 16 is in communication with the external pipelines or channels, which is convenient for the flow path arrangement, and the overall structure is compact.

An axial direction of the body portion 151 is taken as an axial direction of the valve body component 15, the protruding portion 152 protrudes from the body portion 151 along a radial direction of the valve body component 15, each lug 157 is provided with an end part 1571, the end part 1571 faces the flow channel connecting portion 16, the communication port 1561 of the second flow channel is arranged at the end part 1571, the end part 1571 has a bottom end face 1575, in a radial cross section parallel to the valve body component 15, at least two of the bottom end faces 1575 are located in the same cross section.

The flow channel connecting portion 16 is provided with flow guide portions 162, and the flow guide portions 162 correspond to the lugs 157. Each of the flow guide portions 162 has a groove 1621 and a top end surface 1622, the groove 1621 forms at least part of the third flow channel 161, the groove 1621 is in communication with the communication port 1561 of the second flow channel, the top end surface 1622 and the corresponding bottom end surface 1575 are fixed by welding, and the welding position between the top end face 1622 and the bottom end face 1575 is located at the radial cross sectional of the body portion 151.

The structure of valve core component 12 is briefly shown in FIG. 24, the valve core component 12 can rotate in the valve body component 15, to change communication relationships between the first flow channel 13 and the second flow channels 156, thereby realizing flow channel switching.

In this embodiment, four lugs 157 protrude from the valve body component 15, the flow channel connecting portion 16 is integrally formed by injection molding, the communication ports 1618 of the third flow channels 161 face the valve body component 15, the communication ports 1618 of the third flow channels 161 are arranged to be corresponding to the communication ports 1561 of the second flow channels respectively, the number of the third flow channels 161 the flow channel connecting portion 16 is the same as the number of the second flow channels 156, the second flow channels 156 and the third flow channels 161 are in one-to-one correspondence. In this way, the fluid control device can realize the flow channel switching among channels of four connecting ports.

In other embodiments, the fluid control device can also realize flow channel switching of other number of connecting ports; for example, referring to FIG. 26 to FIG. 29, FIG. 26 shows the structure of a fluid control device 70, the structure of the fluid control device 70 is generally similar to that of the fluid control device 60; in this embodiment, five lugs 157 protrude from the valve body component 15, the communication ports 1618 of the third flow channels 161 are arranged to be corresponding to the communication ports 1561 of the second flow channels respectively, the number of the third flow channels 161 of the flow channel connecting portion 16 is the same as the number of the second flow channels 156, the second flow channels 156 and the third flow channels 161 are in one-to-one correspondence. In this way, the fluid control device can realize the flow channel switching among channels of five connecting ports.

The valve body component 15 has a cylindrical structure, the valve body component 15 is provided with a first end 153 and a second end 154 in the axial direction of the valve body component 15, the fluid control assembly 11 is provided with a control component 14, the control component 14 is located at a side where the first end 153 is located, and the lugs 157 protrudes between the first end 153 and the second end 154.

The communication ports 1561 of the second flow channels are located in a radial cross section between the first end 153 and the second end 154. In a longitudinal section where the axis of the body portion 151 is located, each of the lugs 157 is provided with a root portion 1573 and an outer edge portion 1574, the communication port 1561 of the second flow channel is located between the root portion 1573 and the outer edge portion 1574; in a radial cross section of the body portion 151, a distance between at least part of the outer edge portion 1574 and the axis of the body portion 151 is greater than a distance between the corresponding root portion 1573 and the axis of the body portion 151.

In this embodiment, the root portion 1573 extends from the peripheral wall 155 of the valve body component 15, and the root portion 1573 extends along an axial direction of the body portion 151, the end part 1571 of the root portion 1573 forms a part of a wall of the communication port 1561 of the second flow channel.

The flow channel connecting portion 16 is provided with a notch 165, and part of the valve body component 15 is located in the notch 165. In this way, the flow channel connecting portion 16 can protrude on a peripheral side of the valve body component 15, so that an overall height of the fluid control device is relatively small. The communication port 1561 of the second flow channel of the valve body component 15 can be in communication with the third flow channel 161 of the flow channel connecting portion 16, and the flow channel connecting portion 16 is in communication with the external pipelines or channels, which is convenient for the flow path arrangement, and the overall structure is compact.

An axial direction of the body portion 151 is taken as an axial direction of the valve body component 15, the protruding portion 152 protrudes from the body portion 151 along a radial direction of the valve body component 15, each of the lugs 157 is provided with an end part 1571, the end part 1571 faces the flow channel connecting portion 16, the communication port 1561 of the second flow channel is arranged at the end part 1571, the end part 1571 has a bottom end face 1575, in a radial cross section parallel to the valve body component 15, at least two of the bottom end faces 1575 are located in the same cross section.

The flow channel connecting portion 16 is provided with flow guide portions 162, the flow guide portions 162 correspond to the lugs 157, each of the flow guide portions 162 has a groove 1621 and a top end surface 1622, the groove 1621 is in communication with the communication port 1561 of the second flow channel, the top end surface 1622 is fixed to the corresponding bottom end surface 1575 by welding, and the welding position between the top end face 1622 and the bottom end face 1575 is located at the radial cross section of the body portion 151.

Figure 30:
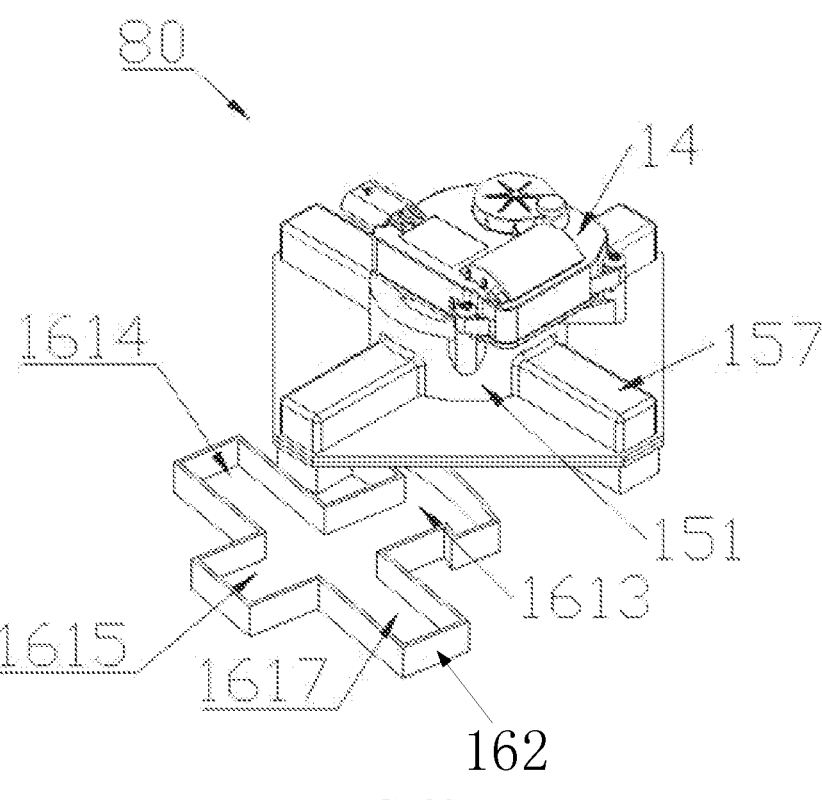
FIG. 30 is a schematic view showing the structure of a fluid control device according to still another embodiment of the present application.
Figure 31:
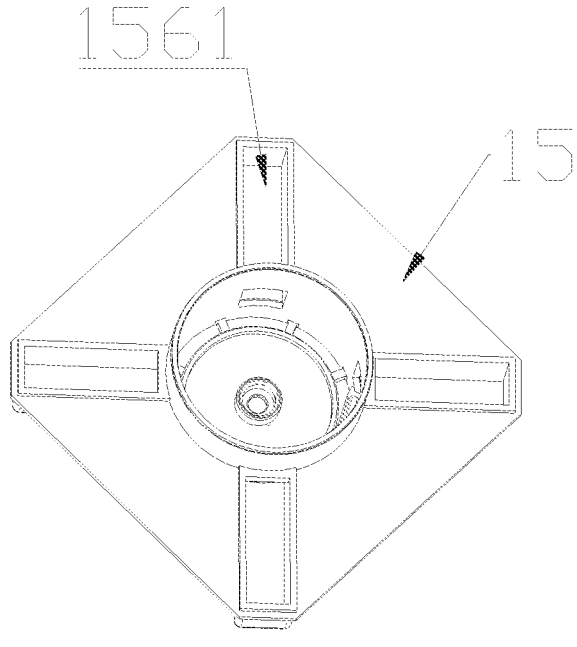
FIG. 31 is a schematic view showing the structure of a valve body component in FIG. 30.
Figure 32:
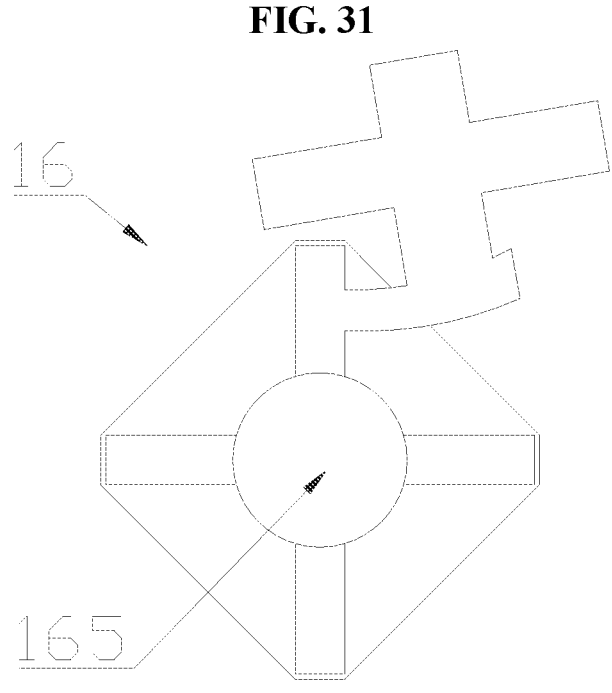
FIG. 32 is a schematic view showing the structure of a flow channel connecting portion in FIG. 31.

Referring to FIG. 30 to FIG. 32, which schematically show the structure of a fluid control device 80, where the fluid control device 80 includes a fluid control assembly 11 and a flow channel connecting portion 16, the fluid control assembly 11 mainly includes a valve core component 12, a valve body component 15 and a control component 14. Most of the structure of the fluid control device 80 can refer to the fluid control device 60, and the similar features are not described again.

The valve body component 15 has a cylindrical structure, the valve body component 15 is provided with a first end 153 and a second end 154 in the axial direction of the valve body component 15, the fluid control assembly 11 is provided with a control component 14, the control component 14 is located at a side where the first end 153 is located, and the lugs 157 protrude between the first end 153 and the second end 154.

The communication ports 1561 of the second flow channels are located in a radial cross section between the first end 153 and the second end 154. The protruding portion 152 has four lugs 157, each lug 157 is provided with the corresponding communication port 1561 of the second flow channel. The flow channel connecting portion 16 is provided with flow guide portions 162, the flow guide portions 162 are arranged to match the lugs 157. Each of the flow guide portions 162 is provided with a groove 1621 and a top end surface 1622, the groove 1621 is in communication with the communication port 1561 of the second flow channel, the top end surface 1622 is fixed to the corresponding bottom end surface 1575 by welding, and the welding position between the top end face 1622 and the bottom end face 1575 is located at a radial cross section of the body portion 151.

The communication ports 1618 of the third flow channels 161 of the flow channel connecting portion 16 and the communication ports 1561 of the second flow channels are correspondingly arranged. In some embodiments, the third flow channel 161 is provided with a trunk section 1613 and at least one branch section, the communication port 1618 of the third flow channel 161 is located at the trunk section 1613, the at least one branch section is in communication with the trunk section 1613 independently. Exemplarily, the third flow channel 161 is provided with a trunk section 1613, a first branch section 1614, a second branch section 1615 and a third branch section 1617, the communication port of the third flow channel 161 is located at the trunk section 1613, the first branch section 1614, the second branch section 1615, and the third branch section 1617 are respectively connected with the trunk section 1613. In this way, three connecting ports can be formed based on one second flow channel 156 via the adapting of the flow channel connecting portion 16, which can meet different application requirements, and facilitates standardization of the fluid control assembly 11.

In other embodiments, an axial direction of the body portion 151 is taken as an axial direction of the valve body component 15, the lugs 157 protrude from the body portion 151 along a radial direction of the valve body component 15, each of the lugs 157 has an end part 1571, the end part 1571 faces the flow channel connecting portion 16, the communication port 1561 of the second flow channel is arranged at the end part 1571, the end part 1571 has a bottom end face 1575, in a cross section parallel to the axial direction of the valve body component 15, at least two of the bottom end faces 1575 are located in the same cross section.

Figure 33:
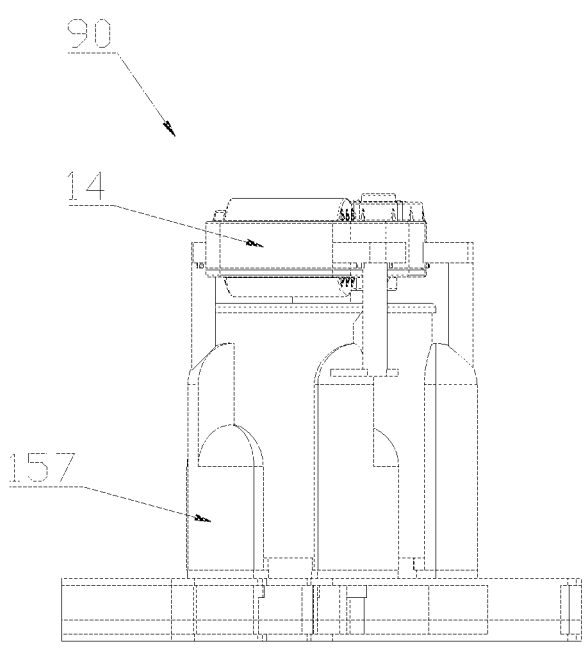
FIG. 33 is a schematic structural view showing the structure of a fluid control device according to still another embodiment of the present application.
Figure 34:
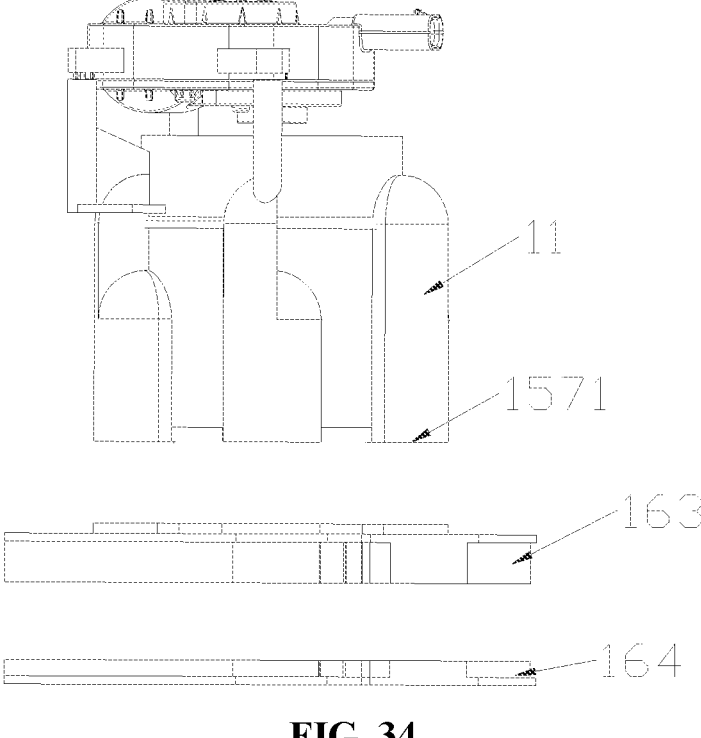
FIG. 34 is a schematic planar view showing the exploded structure of FIG. 33.

Referring to FIG. 33 to FIG. 34, which show the structure of a fluid control device 90, and the structure of the fluid control device 90 is generally similar to that of the fluid control device 10. The fluid control device 90 includes a fluid control assembly 11 and a flow channel connecting portion 16, the fluid control assembly 11 mainly includes a valve core component 12, a valve body component 15 and a control component 14. The fluid control assembly 11 is provided with a valve cavity, most of the valve core component 12 is located in the valve cavity. Most of the structures of the valve body component 15, the valve core component 12 and the control component 14 can refer to the above specific embodiments.

The flow channel connecting portion 16 has a first sub-portion 163 and a second sub-portion 164, the first sub-portion 163 and the second sub-portion 164 are fixed by welding, the communication ports 1618 of the third flow channels 161 are arranged at the first sub-portion 163, the communication ports of the third flow channels 161 and the communication ports 1561 of the second flow channels are correspondingly arranged, the first sub-portion 163 is fixed to the valve body component 15 by welding. The valve body component 15, the first sub-portion 163 and the second sub-portion 164 are all formed by injection molding, and the flow channel connecting portion 16 is designed to have two parts namely the first sub-portion 163 and the second sub-portion 164, which facilitates the molding of the internal structures of the first sub-portion 163 and the second sub-portion 164, thereby simplifying the processing. In a case that the structure of the flow channel connecting portion 16 is very complex, it can be formed by processing sub-portions, and then the sealing of the flow channel is realized by welding, which is convenient for processing and has strong adaptability.

It should be noted that the above embodiments are only used to illustrate the present application rather than limit the technical solutions described in the present application, for example, the directional definition such as "front", "rear", "left", "right", "up" and "down". Although the present application is described in detail in this specification with reference to the above embodiments, those of ordinary skill in the art should understand that those skilled in the art may still make combination, modification or equivalent replacement to the present application, and all technical solutions and improvements thereof that do not depart from the spirit and scope of the present application shall be covered within the scope of the claims of the present application.

The invention claimed is:

1. A fluid control device, comprising a fluid control assembly, wherein the fluid control assembly comprises a valve body component and a valve core component, the fluid control assembly being provided with a valve cavity, at least part of the valve core component being located in the valve cavity; wherein the valve body component is provided with a body portion and a protruding portion, the body portion forms at least part of a wall portion of the valve cavity, the protruding portion protrudes from a peripheral wall of the body portion; the fluid control assembly is provided with a first flow channel, at least part of the first flow channel is located in the valve core component, the protruding portion is provided with two or more second flow channels, and the second flow channels are allowed to be in communication with the first flow channel; and wherein the protruding portion is provided with two or more lugs, at least part of the lugs have the second flow channel, communication ports of at least part of the second flow channels face a same direction;

each of the at least part of the lugs has an end part, each of the communication ports of the at least part of the second flow channels is provided in the corresponding end part; each of the end parts has a bottom end face, and at least two of the bottom end faces are located in a same cross section; wherein the fluid control device further comprises a flow channel connecting portion, wherein the flow channel connecting portion is provided with two or more third flow channels, the communication ports of the at least part of the second flow channels of the lugs face the same direction, that is, facing toward the flow channel connecting portion; the second flow channel is in communication with the corresponding third flow channel, the second flow channel and the third flow channel which are in communication with each other are arranged in a sealed manner.

2. The fluid control device according to claim 1, wherein on a longitudinal cross section where an axis of the body portion is located, the lugs each have a root portion and an outer edge portion, each of the communication ports of the at least part of the second flow channels is located between the corresponding root portion and the corresponding outer edge portion; and in a radial cross section of the body portion, a distance between at least part of the outer edge portion and the axis of the body portion is greater than a distance between the corresponding root portion and the axis of the body portion.

3. The fluid control device according to claim 2, wherein each of the root portions extends from the peripheral wall of the valve body component, part of the end part located at the corresponding root portion forms part of a wall of the corresponding communication port of the second flow channel; and at least part of each of the root portions extends along the peripheral wall of the body portion, or each of the root portions extends in a direction having an included angle "a" with respect to the axis of the body portion, wherein the included angle "a" between the corresponding root portion and the axis of the body portion is (0, 90].

4. The fluid control device according to claim 1, wherein the valve body component has a cylindrical structure, and the valve body component is provided with a first end and a second end in an axial direction of the valve body component; and the fluid control assembly is provided with a control component, the control component is located at a side where the first end is located, and each of the lugs protrudes from the second end; or, the control component is located at a side of the first end, the lugs protrude between the first end and the second end.

5. The fluid control device according to claim 1, wherein the valve core component is provided with a hole passage or a groove, at least part of the first flow channel is located in the hole passage or the groove; the valve core component is configured to move relative to the valve body component, wherein under different conditions, the hole passage or the groove is in communication with the corresponding second flow channel in different lugs.

6. The fluid control device according to claim 1, wherein the flow channel connecting portion is integrally formed by injection molding, the body portion and the protruding portion are integrally formed by injection molding, the flow channel connecting portion and the protruding portion are fixed by welding and sealed.

7. The fluid control device according to claim 1, wherein the flow channel connecting portion comprises a first sub-portion and a second sub-portion, the first sub-portion is extended from the lug in an integral manner, the first sub-portion is provided with a first groove, a wall portion corresponding to the first groove is fixed to the second sub-portion by welding; or the flow channel connecting portion comprises a first sub-portion and a second sub-portion, the first sub-portion and the second sub-portion are fixed by welding, the first sub-portion has communication ports of the third flow channels, the communication ports of the third flow channels and the communication ports of the second flow channels are correspondingly arranged, and the first sub-portion and the valve body component are fixed by welding.

8. The fluid control device according to claim 1, wherein an axial direction of the body portion is taken as an axial direction of the valve body component, at least part of the protruding portion protrudes from the body portion along a radial direction of the valve body component, each of the lugs has the end part, the end part faces the flow channel connecting portion, and each of the communication ports of the at least part of the second flow channels is arranged in the corresponding end part; each end part has the bottom end face, in a cross section parallel to the radial direction of the valve body component, the at least two of the bottom end faces are located in the same cross section; and at least part of the second flow channel of the lug extends along the axial direction of the valve body component.

9. The fluid control device according to claim 1, wherein an axial direction of the body portion is taken as an axial direction of the valve body component, at least part of each of the lugs protrudes from the body portion along a radial direction of the valve body component, each of the lugs has the end part, the end part faces the flow channel connecting portion, and each of the communication ports of the at least part of the second flow channels is arranged in the end part; each end part has the bottom end face, in a cross section parallel to the axial direction of the valve body component, the at least two of the bottom end faces are located in the same cross section; and the second flow channel of the lug extends along the radial direction of the valve body component.

10. The fluid control device according to claim 1, wherein an axial direction of the body portion is taken as an axial direction of the valve body component, at least part of each of the lugs protrudes from the body portion along a radial direction of the valve body component; wherein each of the lugs has the end part, the end part faces the flow channel connecting portion, and each of the communication ports of the at least part of the second flow channels is arranged in the end part; each end part has the bottom end face, in a cross section of 0-90 degrees with respect to the axial direction of the valve body component, the at least two of the bottom end faces are located in the same cross section.

11. The fluid control device according to claim 1, wherein the protruding portion is provided with a connecting portion, at least part of the connecting portion is located between the corresponding lugs and connected with outer walls of the corresponding lugs; wherein the connecting portion and the flow channel connecting portion are fixed by welding.

12. The fluid control device according to claim 1, wherein each of the third flow channels has a communication port facing the valve body component, the communication ports of the third flow channels and the communication ports of the second flow channels are arranged in one-to-one correspondence; the number of the third flow channels of the flow channel connecting portion is the same as the number of the second flow channels, and the second flow channels and the third flow channels are in one-to-one correspondence; or, each of the third flow channels has a communication port facing the valve body component, at least one of the third channels of the flow channel connecting portion has a third flow channel first portion and a third flow channel second portion, the third flow channel first portion and the third flow channel second portion are independently arranged at the flow channel connecting portion, and are in communication with the same second flow channel.

13. The fluid control device according to claim 1, wherein each of the third flow channels of the flow channel connecting portion has a communication port corresponding to the communication port of the corresponding second flow channel, the third flow channel has a trunk section and at least one branch section, the communication port of the third flow channel is located in the trunk section, and the branch section is connected with the trunk section separately.

14. The fluid control device according to claim 1, wherein the flow channel connecting portion has a first sub-portion and a second sub-portion, the first sub-portion and the second sub-portion are fixed by welding, communication ports of the third flow channels are arranged at the first sub-portion, the communication ports of the third flow channels and the communication ports of the second flow channels are correspondingly arranged, and the first sub-portion and the valve body component are fixed by welding; or, the flow channel connecting portion has a first sub-portion and a second sub-portion, the first sub-portion extends from the lugs or the body portion in an integral manner, the first sub-portion is provided with a groove, a wall portion corresponding to the groove is fixed to the second sub-portion by welding.

\* \* \* \* \*